(12) United States Patent
Suzuki

(10) Patent No.: US 9,613,734 B2
(45) Date of Patent: Apr. 4, 2017

(54) SHEATHING MEMBER MOUNTING APPARATUS AND SHEATHING MEMBER MOUNTING METHOD

(71) Applicant: YAZAKI CORPORATION, Tokyo (JP)

(72) Inventor: Yoshiaki Suzuki, Shizuoka (JP)

(73) Assignee: YAZAKI CORPORATION, Tokyo (JP)

(\*) Notice: Subject to any disclaimer, the term of this patent is extended or adjusted under 35 U.S.C. 154(b) by 0 days.

(21) Appl. No.: 14/586,467

(22) Filed: Dec. 30, 2014

(65) Prior Publication Data

US 2015/0107748 A1    Apr. 23, 2015

Related U.S. Application Data

(63) Continuation of application No. PCT/JP2013/070044, filed on Jul. 24, 2013.

(30) Foreign Application Priority Data

Jul. 25, 2012 (JP) ................. 2012-164461

(51) Int. Cl.
*H01B 13/012* (2006.01)
*B60R 16/02* (2006.01)
(Continued)

(52) U.S. Cl.
CPC ... *H01B 13/01209* (2013.01); *B60R 16/0207* (2013.01); *H01B 13/0129* (2013.01);
(Continued)

(58) Field of Classification Search
CPC .......... H01B 13/01209; H01B 13/0129; H01B 13/22
(Continued)

(56) References Cited

U.S. PATENT DOCUMENTS 4,424,627 A    1/1984 Tarbox
5,329,677 A    7/1994 Kanzaka
(Continued)

FOREIGN PATENT DOCUMENTS

CN    1080827 A    1/1994
CN    1146608 A    4/1997
(Continued)

OTHER PUBLICATIONS

International Search Report for PCT/JP2013/070044 dated Oct. 1, 2013.
(Continued)

*Primary Examiner* — Jeff Aftergut
(74) *Attorney, Agent, or Firm* — Kenealy Vaidya LLP

(57) ABSTRACT

A sheathing member mounting apparatus is provided with a support mechanism that supports a sheet member from the side of a protective layer, electric wire holding mechanisms that hold an electric wire portion in a state of being disposed along a bonding layer of the sheet member, and a folding mechanism that folds the sheet member in two. A second region supported by a second support portion is pivoted toward a first support portion, whereby the electric wire portion of a wire harness is sandwiched in the folded sheet member to be covered.

11 Claims, 17 Drawing Sheets

(51) Int. Cl.
*H02G 3/04* (2006.01)
*H01B 13/22* (2006.01)

(52) U.S. Cl.
CPC ....... *H01B 13/01236* (2013.01); *H01B 13/22* (2013.01); *H02G 3/0487* (2013.01)

(58) Field of Classification Search
USPC .......................................................... 156/50
See application file for complete search history.

(56) References Cited

U.S. PATENT DOCUMENTS

| | | | |
|---|---|---|---|
| 5,905,231 A | | 5/1999 | Houte et al. |
| 6,071,446 A | * | 6/2000 | O'Brien ................ B29C 33/123 264/261 |
| 6,274,813 B1 | | 8/2001 | Houte et al. |
| 6,302,980 B1 | * | 10/2001 | Kortenbach ........... H01B 7/285 156/227 |
| 6,710,262 B2 | * | 3/2004 | Takada ............. H01B 13/01254 174/259 |
| 2002/0185297 A1 | | 12/2002 | Otsuki et al. |
| 2003/0024850 A1 | | 2/2003 | Synder |
| 2003/0213609 A1 | | 11/2003 | Takada et al. |
| 2006/0289197 A1 | * | 12/2006 | Yabe ..................... H02G 3/0481 174/135 |
| 2013/0000974 A1 | | 1/2013 | Igarashi et al. |

FOREIGN PATENT DOCUMENTS

| | | | |
|---|---|---|---|
| CN | 1678449 A | | 10/2005 |
| DE | 197 46 526 A1 | | 4/1999 |
| JP | 62-78026 A | | 4/1987 |
| JP | 4-329220 A | | 11/1992 |
| JP | 8-129912 A | | 5/1996 |
| JP | 9-147630 A | | 6/1997 |
| JP | 10-283857 A | | 10/1998 |
| JP | 10-310116 A | | 11/1998 |
| JP | 11-7856 A | | 1/1999 |
| JP | 2000-67669 A | | 3/2000 |
| JP | 2002-369349 A | | 12/2002 |
| JP | 2003-331666 A | | 11/2003 |
| JP | 2006-253080 A | | 9/2006 |
| JP | 2008-149871 A | | 7/2008 |
| JP | 2009-302023 A | | 12/2009 |
| JP | 2010-62095 A | | 3/2010 |
| JP | 2010-62095 A | * | 3/2010 |
| JP | 2011-222291 A | | 11/2011 |
| JP | 2012-156396 A | * | 8/2012 |
| JP | 2012-157203 A | * | 8/2012 |
| WO | 03/013834 A1 | | 2/2003 |

OTHER PUBLICATIONS

Written Opinion of the International Search Report for PCT/JP2013/070044 dated Oct. 1, 2013.
English translation of the Written Opinion of the International Search Report for PCT/JP2013/070044 dated Oct. 1, 2013 and PCT/IB338 and PCT/IB373.
Japanese Office Action for the related Japanese Patent Application No. 2012-164461 dated Jun. 7, 2016.
The extended European search report for the related European Patent Application No. 13822688.1 dated Feb. 24, 2016.
Chinese Office Action for the related Chinese Patent Application No. 201380039334.3 dated Feb. 23, 2016.
Chinese Office Action for the related Chinese Patent Application No. 2013800393343 dated Oct. 19, 2016.
Chinese Office Action for the related Chinese Patent Application No. 201380039334.3 dated Aug. 5, 2016.
Chinese Office Action for the related Chinese Patent Application No. 201380039334.3 dated Feb. 3, 2017.

* cited by examiner (a)

(b)

SHEATHING MEMBER MOUNTING APPARATUS AND SHEATHING MEMBER MOUNTING METHOD

CROSS REFERENCE TO RELATED APPLICATIONS

This application is a continuation of PCT application No. PCT/JP2013/0070044, which was filed on Jul. 24, 2013 based on Japanese Patent Application (No. 2012-164461) filed on Jul. 25, 2012, the contents of which are incorporated herein by reference.

BACKGROUND OF THE INVENTION

1. Field of the Invention

The present invention relates to a sheathing member mounting apparatus and a sheathing member mounting method 2. Description of the Related Art Conventionally, various kinds of sheathing members have been proposed for covering, for protection, the electric wire portions of a wire harness arranged in a vehicle or the like (see JP-A-11-7856 and JP-A-2009-302023). A sheathing member (protective material) described in JP-A-11-7856 is formed of a polyvinyl chloride sheet. After this sheet is wound around the periphery of the electric wire group, both ends in the sheet winding direction are laid one on the other, and the overlaid part is disposed in a thermo compression bonding portion of a thermal welding machine and welded by being pressurized and heated. Thereby, the sheet is mounted to the wire harness. A sheathing member (protective sheet) described in JP-A-2009-302023 is structured so as to be provided with a rubber sheet and an adhesive layer formed on one surface thereof. This sheet is wound around the periphery of the electric wire group, so that the adhesive layer adheres to the electric wire group and the adhesive layer on the end side in the winding direction is laid on the sheet on the start side and adheres thereto. Thereby, the sheet is mounted to the wire harness.

It is common practice that the wire harness is two-dimensionally disposed substantially along the wiring configuration when it is arranged in a vehicle or the like and the sheathing member is mounted in this disposition condition. That is, as shown in (a) of FIG. 19, a wire harness W is held in a predetermined arranging form in a manner such that a plurality of preharnesses each having a connector C connected to the terminal portion thereof are placed on a wiring board or the like and wiring portions W1 of these preharnesses are locked by locking pins or the like. Then, as shown in (b) of FIG. 19, a sheathing member P is mounted to the wiring portion W1 of each predetermined section, and the end portions of the sheathing members P are fixed to the wiring portions W1 by tape T; by this or the like, production is performed. Therefore, it is necessary to appropriately mount sheathing members to predetermined wire portions according to such a procedure of producing the wire harness W.

However, according to the above-described conventional mounting method as described in JP-A-11-7856, it is necessary to prepare a thermal welding machine for each sheathing member mounting position or move the thermal welding machine. For this reason, various problems arise such that the production equipment becomes large-scale and that the labor of the mounting work becomes huge. On the other hand, according to the above-described conventional mounting method as described in JP-A-2009-302023, sheets are wound and bonded one by one by a worker's manual operation. For this reason, there are also problems such that the workability of mounting the sheathing member cannot be enhanced and that when the sheet is wound, the adhesive layer adheres to a wrong part to waste the sheet. For this reason, development of a mounting apparatus is desired that is capable of efficiently mounting the sheathing member to the wire harness held in a predetermined arranging form.

SUMMARY OF THE INVENTION

An object of the present invention is, in view of the above-described points, to provide a sheathing member mounting apparatus and a sheathing member mounting method by which the efficiency of the sheathing member mounting work is improved without the apparatus becoming large or complicated.

The above-mentioned object of the present invention is attained by the following structures:

(1) A sheathing member mounting apparatus for mounting a sheathing member for covering an electric wire portion of a wire harness, to the wire harness, the sheathing member: being formed of a sheet member that is formed in a shape of a sheet where a bonding layer is provided on one surface and a protective layer is provided on the other surface; sandwiching the electric wire portion under a condition where the bonding layer is on an inside; and covering the electric wire portion by the bonding layer being bonded together, the sheathing member mounting apparatus comprising: a support mechanism that supports the sheet member from a side of the protective layer; an electric wire holding mechanism that holds the electric wire portion in a state of being disposed along the bonding layer of the sheet member supported by the support mechanism; and a folding mechanism that folds in two the sheet member supported by the support mechanism, wherein the support mechanism includes: a first support portion that supports a region substantially half of a plane of the sheet member; and a second support portion that supports a remaining region of the sheet member other than the region substantially half of the plane, and the remaining region of the sheet member is pivoted toward the first support portion by the folding mechanism, whereby the sheet member is folded.

(2) The sheathing member mounting apparatus according to the above (1), wherein the sheet member includes a protruding member that protrudes from the protective layer, and is mountable to a fixed body by engagement of the protruding member, and one or more than one concave portion for receiving the protruding member is formed on at least one of the first support portion and the second support portion, and the concave portion is provided in a predetermined position in a direction of the plane of the sheet member or provided so as to be movable in a direction of the plane of the sheet member.

(3) The sheathing member mounting apparatus according to the above (1) or (2), wherein the bonding layer of the sheet member is formed of any of a self-welding type, a bonding type and a hot-melt type, and when the bonding layer is formed of the self-welding type, a pressing mechanism that presses the sheet member folded by the folding mechanism is provided, and when the bonding layer is formed of the hot-melt type, a heating mechanism that heats the sheet member is provided to the support mechanism.

(4) The sheathing member mounting apparatus according to any of the above (1) to (3), wherein the folding mechanism includes: a hinge portion where the second support portion is pivotably supported; and a slide member where the hinge portion is slidably supported, includes a hinge portion where the second support portion is pivotably supported; and a link member where an other end side extending from the hinge portion is pivotably supported, or includes a first movement mechanism by which the remaining region of the sheet member is raised from the second support portion; and a second movement mechanism by which the remaining region of the sheet member raised by the first movement mechanism is moved toward the first support portion.

(5) The sheathing member mounting apparatus according to any of the above (1) to (4), wherein the support mechanism includes: a support surface abutting on the protective layer of the sheet member; and a groove portion recessed from the support surface and extending along the electric wire portion held by the electric wire holding mechanism.

(6) The sheathing member mounting apparatus according to any of the above (1) to (5), wherein the electric wire portion is formed of a plurality of electric wires, and an electric wire twisting mechanism by which the plurality of electric wires are rotated and twisted is further provided.

(7) A sheathing member mounting method for mounting a sheathing member for covering an electric wire portion of a wire harness, to the wire harness, the sheathing member: being formed of a sheet member that is formed in a shape of a sheet where a bonding layer is provided on one surface and a protective layer is provided on the other surface; sandwiching the electric wire portion under a condition where the bonding layer is on an inside; and covering the electric wire portion by the bonding layer being bonded together, wherein the sheet member is supported from a side of the protective layer, and after the electric wire portion is held in a state of being disposed along the bonding layer of the supported sheet member, toward a region substantially half of a plane of the sheet member, a remaining region other than the region substantially half of the plane is pivoted, whereby the sheet member is folded and the electric wire portion is covered by the sheet member.

(8) The sheathing member mounting method according to the above (7), being a method in which the sheet member includes a protruding member that protrudes from the protective layer, and is mountable to a fixed body by engagement of the protruding member, and the sheet member is folded under a condition where the protruding member is inserted into a concave portion, wherein a predetermined concave portion is selected from among a plurality of concave portions provided in a direction of the plane of the sheet member and the protruding member is inserted thereinto, or the concave portion provided so as to be movable in the direction of the plane of the sheet member is moved to a predetermined position and the protruding member is inserted thereinto.

(9) The sheathing member mounting method according to the above (7) or (8), wherein the bonding layer of the sheet member is formed of any one of a self-welding type, a bonding type and a hot-melt type, and when the bonding layer is formed of the self-welding type, the folded sheet member is pressed so that the bonding layer is bonded together, and when the bonding layer is formed of the hot-melt type, the sheet member is heated so that the bonding layer is bonded together.

(10) The sheathing member mounting method according to any of the above (7) to (9), wherein the electric wire portion is formed of a plurality of electric wires, and the sheet member is folded after the plurality of electric wires are rotated and twisted.

According to the sheathing member mounting apparatus of the structure of the above (1), from the condition where the sheet member is supported by the support mechanism, the sheet member is folded by the folding mechanism, and the electric wire portion of the wire harness is sandwiched in the folded sheet member to be covered, whereby the sheathing member can be mounted to the wire harness easily and reliably. In this case, the sheet member is supported from the side of the protective layer by the first support portion and the second support portion of the support mechanism, whereby this sheet member can be easily folded in two by the folding mechanism while the bonding layer provided on one surface can be prevented from being bonded to a wrong position. Further, since the electric wire portion disposed along the bonding layer of the sheet member is held by the electric wire holding mechanism, it is unnecessary for the worker to hold the wire harness, so that the mounting of the sheet member can be performed more efficiently.

According to the sheathing member mounting apparatus of the structure of the above (2), in a case in which the sheet member where the protruding member for mounting to the fixed body is formed is used, since the concave portion for receiving the protruding member is formed on the first support portion and the second support portion, the sheet member can be supported in a flat state without obstructed by the protruding member. Further, if the concave portion is provided so as to be movable in the direction of the plane of the sheet member, a plurality of kinds of sheet members where the positions of the concave portions are different can be handled, so that the versatility of the sheathing member mounting apparatus can be enhanced.

According to the sheathing member mounting apparatus of the structure of the above (3), the bonding layer can be reliably bonded together according to the type of the bonding layer of the sheet member. That is, the sheet member folded in two covers the electric wire portion that it sandwiches, and can reliably maintain this covered state. Further, if the heating mechanism that heats the sheet member is provided to the support mechanism, the bonding layer can be bonded by being melted under a condition where the sheet member including a hot-melt type bonding layer is supported by the support mechanism. Consequently, the sheathing member mounting apparatus of the structure of the above (3) is capable of suppressing the increase in the labor of work while preventing the apparatus from becoming complicated or large since it is unnecessary to use a separate thermal welding machine or the like.

According to the sheathing member mounting apparatus of the structure of the above (4), when the folding mechanism has a structure provided with the hinge portion and the slide member or provided with the hinge portion and the slide portion, the second support portion can move along a pivot locus other than an arc, so that the distance between the first support portion and the second support portion when the sheet member and the electric wire portion are sandwiched can be set appropriately. Moreover, when the folding mechanism has a structure provided with the first movement mechanism and the second movement mechanism, only the remaining region of the sheet member moves while the second support portion does not move, whereby the sheet member is folded. Consequently, according to the sheathing member mounting apparatus of the structure of the above (4), the apparatus structure is further simplified.

According to the sheathing member mounting apparatus of the structure of the above (5), since the groove portion recessed from the support surface of the support mechanism is provided, part of the sheet member and the electric wire portion can be received in this groove portion, so that the bonding layer of the sheet member folded in two can be bonded together by the support surface other than the groove portion. Consequently, when the sheet member is pressed to be bonded, the pressing force can be prevented from acting on the electric wire portion, so that the adhesion of the bonding layer of the sheet member is enhanced to improve the adhesive power while disconnection and breakage of the electric wire portion is prevented.

According to the sheathing member mounting apparatus of the structure of the above (6), since a plurality of electric wires are rotated and twisted by the electric wire twisting mechanism, the electric wire portion formed of a plurality of electric wires is collectively disposed in a predetermined range of the sheet member. Consequently, the sheathing member mounting apparatus of the structure of the above (6) makes the sheet member easy to fold and reduces the required area of the sheet member to enable material saving.

According to the sheathing member mounting method of the above (7), the sheet member is folded from the condition where it is supported, and the electric wire portion of the wire harness is sandwiched in the folded sheet member to be covered, whereby the sheathing member is mounted to the wire harness easily and reliably. In this case, the sheet member is supported from the side of the protective layer, whereby this sheet member can be easily folded in two while the bonding layer provided on one surface can be prevented from being bonded to a wrong position.

According to the sheathing member mounting method of the structure of the above (8), in a case in which the sheet member where the protruding member for mounting to the fixed body is formed is used, since the sheet member is folded under a condition where the protruding member is received in the concave portion, the sheet member can be folded in two without obstructed by the protruding member. Further, since the protruding member is inserted in the concave portion selected from among a plurality of concave portions provided in the direction of the plane of the sheet member or the concave portion is moved and the protrusion is inserted thereinto, a plurality of kinds of sheet members where the positions of the concave portions are different can be handled.

According to the sheathing member mounting method of the structure of the above (9), the bonding layer can be reliably bonded together according to the type of the bonding layer of the sheet member. That is, the sheet member folded in two covers the electric wire portion that it sandwiches, and can reliably maintain this covered state.

According to the sheathing member mounting method of the structure of the above (10), since a plurality of electric wires are rotated and twisted, the electric wire portion formed of a plurality of electric wires is collectively disposed in a predetermined range of the sheet member. Consequently, the sheathing member mounting method of the structure of the above (10) makes the sheet member easy to fold and reduces the required area of the sheet member to enable material saving.

Figure 19:
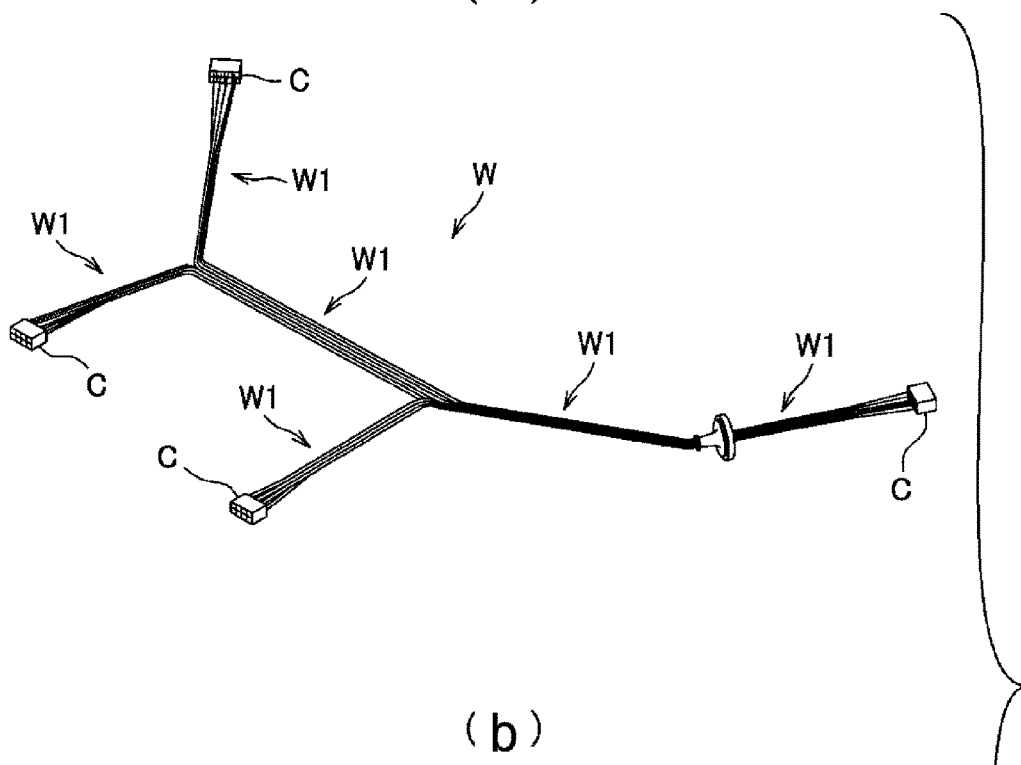
Figure 19:
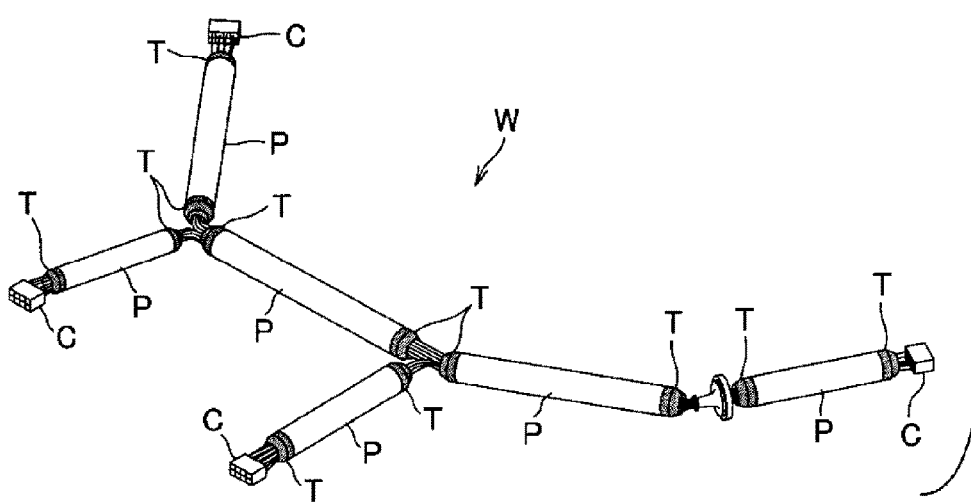

(a) and (b) of FIG. 19 are perspective views for explaining the procedure of mounting a sheathing member according to the conventional art.

DETAILED DESCRIPTION OF THE EXEMPLARY EMBODIMENTS

[First Embodiment]

Hereinafter, a sheathing member mounting apparatus according to a first embodiment of the present invention will be described with reference to FIG. 1 to FIG. 12.

The sheathing member mounting apparatus 1 of the present first embodiment is an apparatus for mounting, to an electric wire portion W1 of a wire harness W, a sheet member S which is a sheathing member covering it in the process of producing the wire harness W. This sheathing member mounting apparatus 1 is provided in a plurality of positions of a wiring board or the like for placing the wire harness W in a predetermined wiring form or is provided so as to be movable over a plurality of positions of a wiring board or the like. The sheathing member mounting apparatus 1 is structured so as to be capable of mounting the sheet member S to the electric wire portion W1 of each predetermined section of the wire harness W. The sheet member S is formed in the shape of a sheet where a bonding layer S1 is provided on one surface and a protective layer S2 is provided on the other surface. The sheet member S is folded in two so that the protective layer S2 as the exterior surface is on the outside under a condition where the bonding layer S1 is on the inside, and the bonding layer S1 is bonded together, thereby protecting the electric wire portion W1 sandwiched in the sheet member S.

Figure 1:
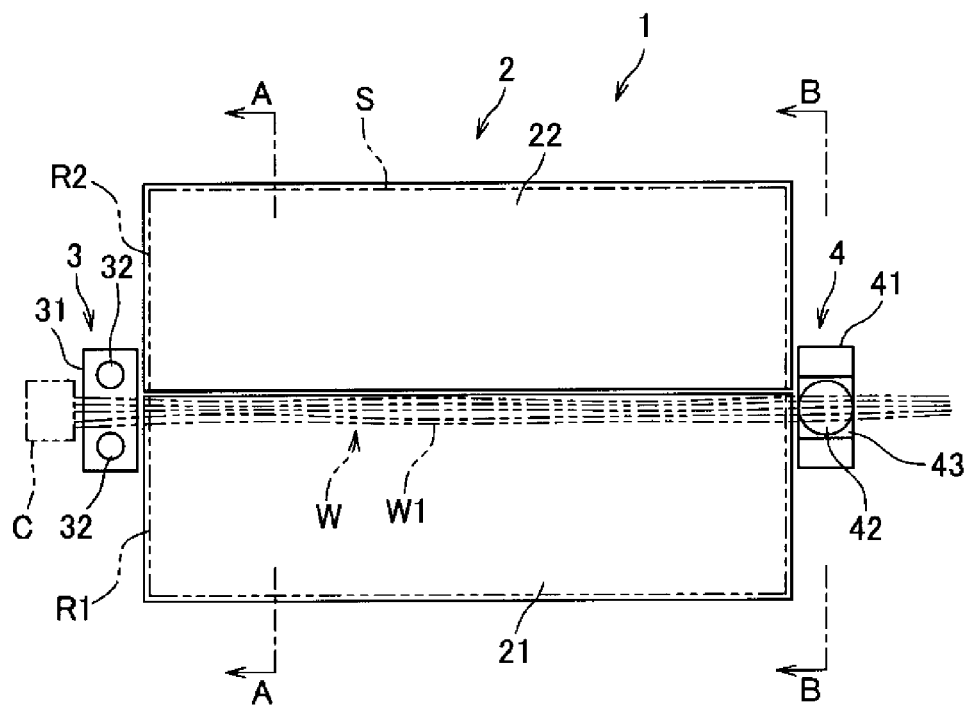
FIG. 1 is a plan view showing a sheathing member mounting apparatus according to a first embodiment of the present invention.
Figure 2A:
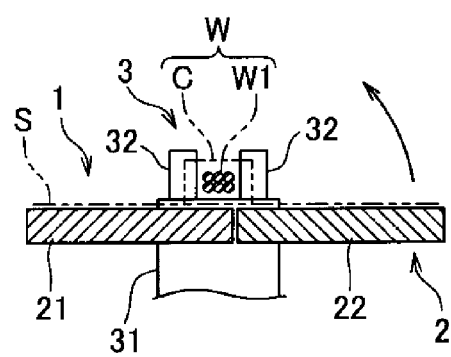
FIG. 2A is a cross-sectional view taken on arrow A-A of FIG. 1.
Figure 2B:
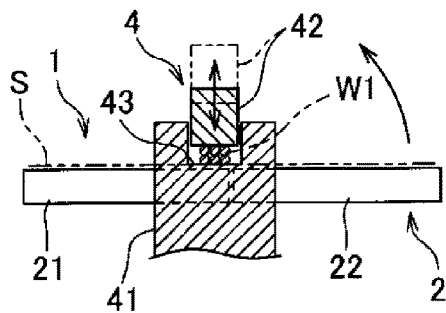
FIG. 2B is a cross-sectional view taken on arrow B-B of FIG. 1.

The sheathing member mounting apparatus 1 is, as shown in FIG. 1 to FIG. 2B, structured so as to be provided with: a support mechanism 2 that supports the sheet member S the bonding layer S1 of which faces upward from the side of the protective layer S2; a pair of electric wire holding mechanisms 3 and 4 that hold the electric wire portion W1 along the bonding layer S1 of the sheet member S supported by the support mechanism 2; and a folding mechanism 5 (described later) that folds in two the sheet member S supported by the support mechanism 2.

Figure 3:
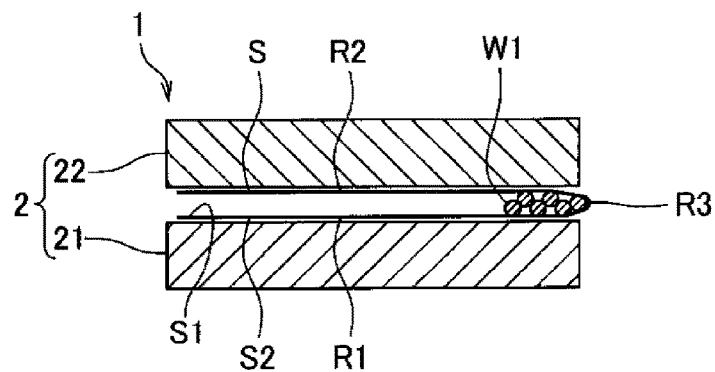
FIG. 3 is a cross-sectional view showing an operation of the sheathing member mounting apparatus shown in FIG. 1.

The support mechanism 2 is, as also shown in FIG. 3, structured so as to have a first support portion 21 that supports a first region R1 which is a region substantially half of the plane of the sheet member S (substantially half region on the lower side of FIG. 1) and a second support portion 22 that supports a second region R2 which is the remaining region of the sheet member S (substantially half region on the upper side of FIG. 1) other than the first region R1. The electric wire portion W1 is situated in the neighborhood of the end edge, on the side of the second support portion 22, of the first support portion 21, that is, in the neighborhood of the second region R2 in the first region R1. And the electric wire portion W1 is disposed along a folding line R3 which is the boundary line between the first region R1 and the second region R2. This support mechanism 2 is structured so that the second support portion 22 is pivoted by the folding mechanism 5 (see FIG. 8 and FIG. 9) to turn around toward the first support portion 21 to thereby fold the second region R2 of the sheet member S toward the first region R1.

Of the electric wire holding mechanism 3 and the electric wire holding mechanism 4, one (the left side of FIG. 1) electric wire holding mechanism 3 holds the electric wire portion W1 continuous with a connector C connected to the terminal portion of the wire harness W, and has a base 31 rising along one end edge of the support mechanism 2 and two locking claws 32 provided upright on the upper surface of the base 31 at an interval. This electric wire holding mechanism 3 is structured so that the electric wire portion W1 is inserted between the two locking claws 32 and the connector C is locked by the locking claws 32 to thereby hold the electric wire portion W1.

The other (the right side of FIG. 1) electric wire holding mechanism 4 holds the electric wire portion W1 in an intermediate position of the wire harness W, and has a first holding member 41 rising along the other end edge of the support mechanism 2 and a second holding member 42 provided so as to be vertically movable above this first holding member 41. At the upper end of the first holding member 41, a holding groove 43 capable of receiving the second holding member 42 is formed. This electric wire holding mechanism 4 is structured so that the electric wire portion W1 is held in such a manner that the electric wire portion W1 is inserted through the holding groove 43 and the second holding member 42 is entered into the holding groove 43 so that the electric wire portion W1 is sandwiched.

Figure 4:
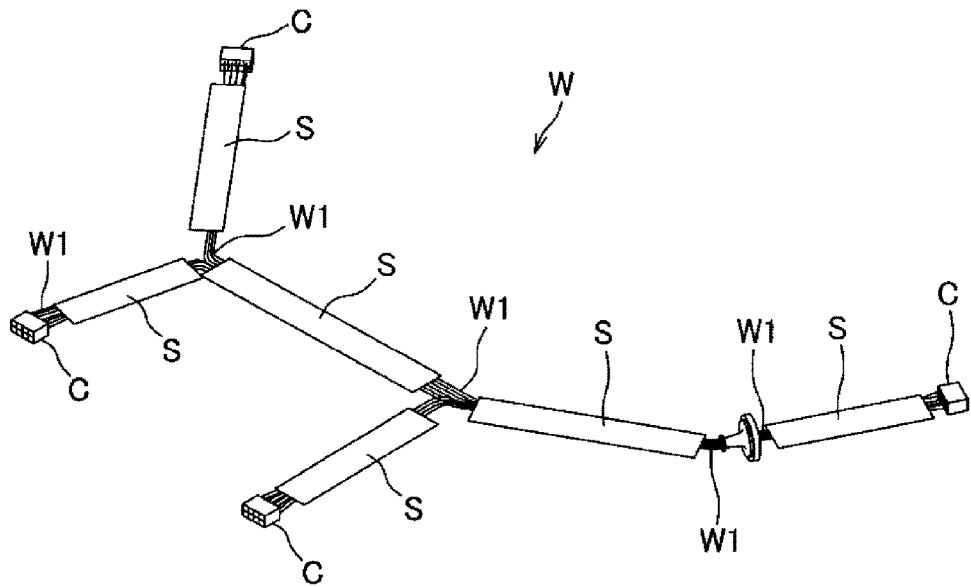
FIG. 4 is a perspective view showing the mounting condition of a sheathing member mounted to a wire harness by the sheathing member mounting apparatus shown in FIG. 1.

According to the above sheathing member mounting apparatus 1, from the condition where the sheet member S is supported by the support mechanism 2 and the electric wire portion W1 is held between the electric wire holding mechanism 3 and the electric wire holding mechanism 4, as shown in FIG. 3, the second support portion 22 is pivoted toward the first support portion 21 to fold the sheet member S and the bonding layer S1 of the second region R2 and the bonding layer S1 of the first region R1 approach each other, whereby these bonding layers S1 are bonded together so that the sheet member S is mounted to the electric wire portion W1. By thus mounting the sheet member S to the plurality of electric wire portions W1 of the wire harness W, as shown in FIG. 4, the wire harness W where the electric wire portions W1 are protected by the sheet member S is produced.

Figure 5:
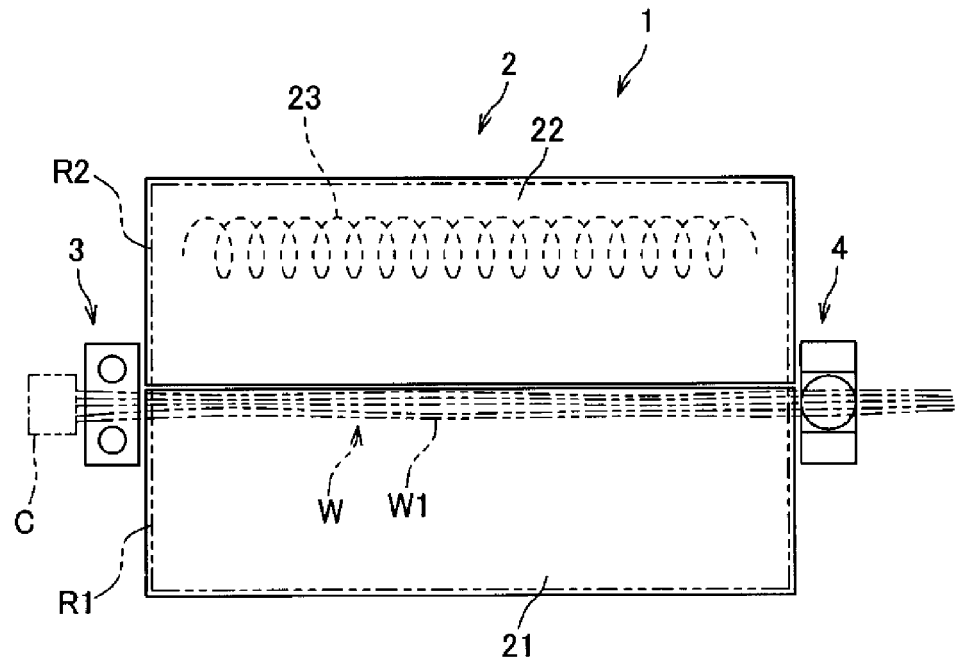
FIG. 5 is a plan view showing a modification of the sheathing member mounting apparatus shown in FIG. 1.

In the sheathing member mounting apparatus 1 of the present first embodiment, when the bonding layer S1 of the sheet member S to be mounted is formed of a hot-melt type, a heating mechanism that heats the sheet member S is provided to the support mechanism 2. As this heating mechanism, as shown in FIG. 5, a coiled heater 23 provided to the second support portion 22 can be shown as an example. Moreover, the heating mechanism may be provided to the first support portion 21 or may be provided to both of the first support portion 21 and the second support portion 22. Further, the heating mechanism is not limited to one incorporated in the first support portion 21 or the second support portion 22 but may be provided so as to be exposed to the outside or may be one that heats the sheet member S from the side opposite to the first support portion 21 and the second support portion 22 with the sheet member S in between.

Figure 6A:
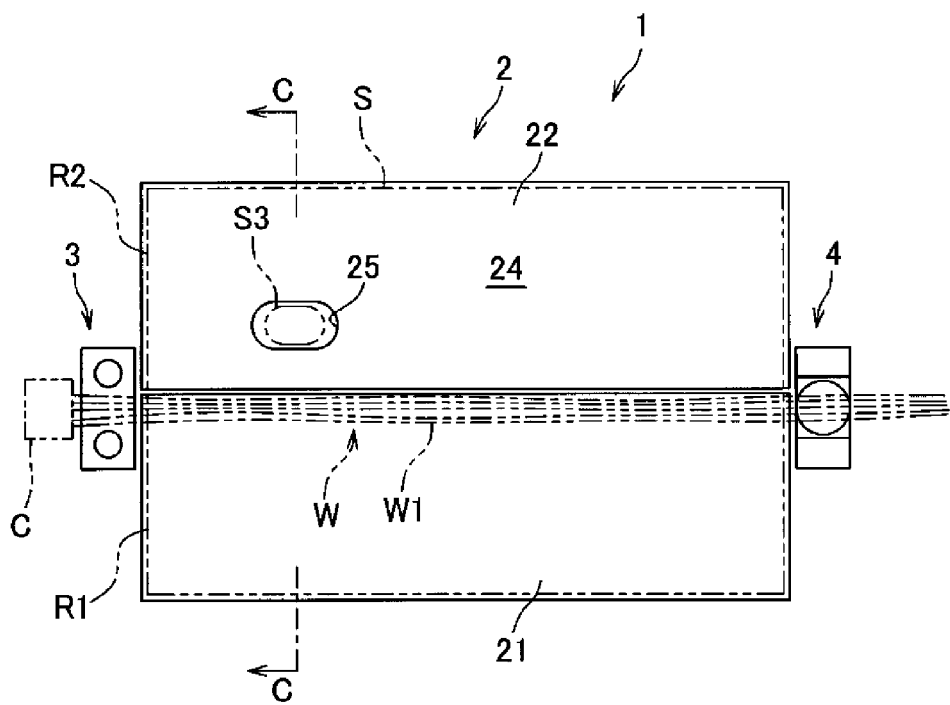
FIG. 6A is a plan view showing another modification of the sheathing member mounting apparatus shown in FIG. 1.
Figure 6B:
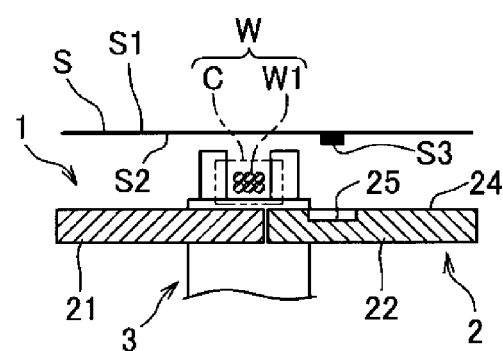
FIG. 6B is a cross-sectional view taken on arrow C-C of FIG. 6A.
Figure 7A:
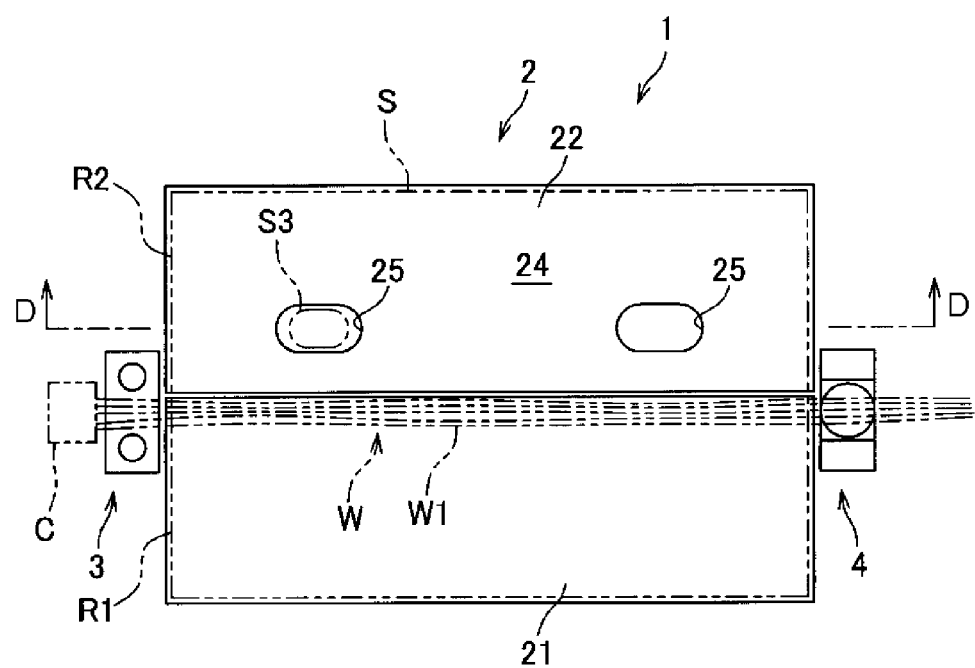
FIG. 7A is a plan view showing still another modification of the sheathing member mounting apparatus shown in FIG. 1.
Figure 7B:
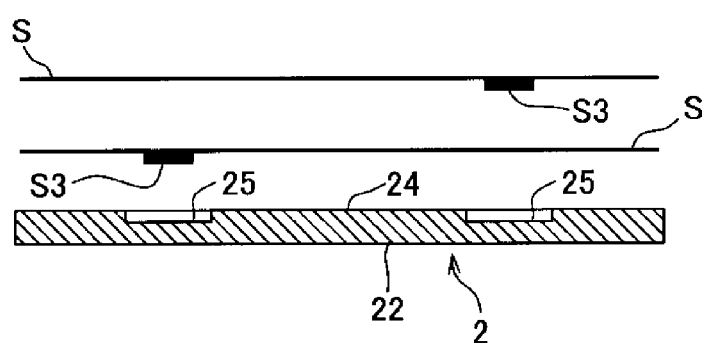
FIG. 7B is a cross-sectional view taken on arrow D-D of FIG. 7A.
(a) to (c) of FIG. 8 are cross-sectional views for explaining an operation of a folding mechanism according to the sheathing member mounting apparatus shown in FIG. 1.
(a) to (c) of FIG. 9 are cross-sectional views for explaining an operation of a modification of the folding mechanism in FIG. 8.

Moreover, in the sheathing member mounting apparatus 1 of the present first embodiment, when the sheet member S to be mounted is structured so as to have a protruding member S3 protruding from the protective layer S2 thereof and to be mountable to a vehicle body (fixed body) by engagement of this protruding member S3, a concave portion 25 for receiving the protruding member S3 is provided on the support mechanism 2. Specifically, as shown in FIG. 6A and FIG. 6B, a support surface 24 abutting on the protective layer S2 of the sheet member S and the concave portion 25 recessed from the support surface 24 in the position corresponding to the protruding member S3 of the sheet member S are formed on the second support portion 22. Moreover, as shown in FIGS. 7A and 7B, the concave portion 25 may be provided in a plurality of positions; these plurality of concave portions 25 correspond to the sheet members S where the protruding member S3 is provided in different positions, and is structured so that the same support mechanism 2 can be used even when these sheet members S are supported.

Figure 8:
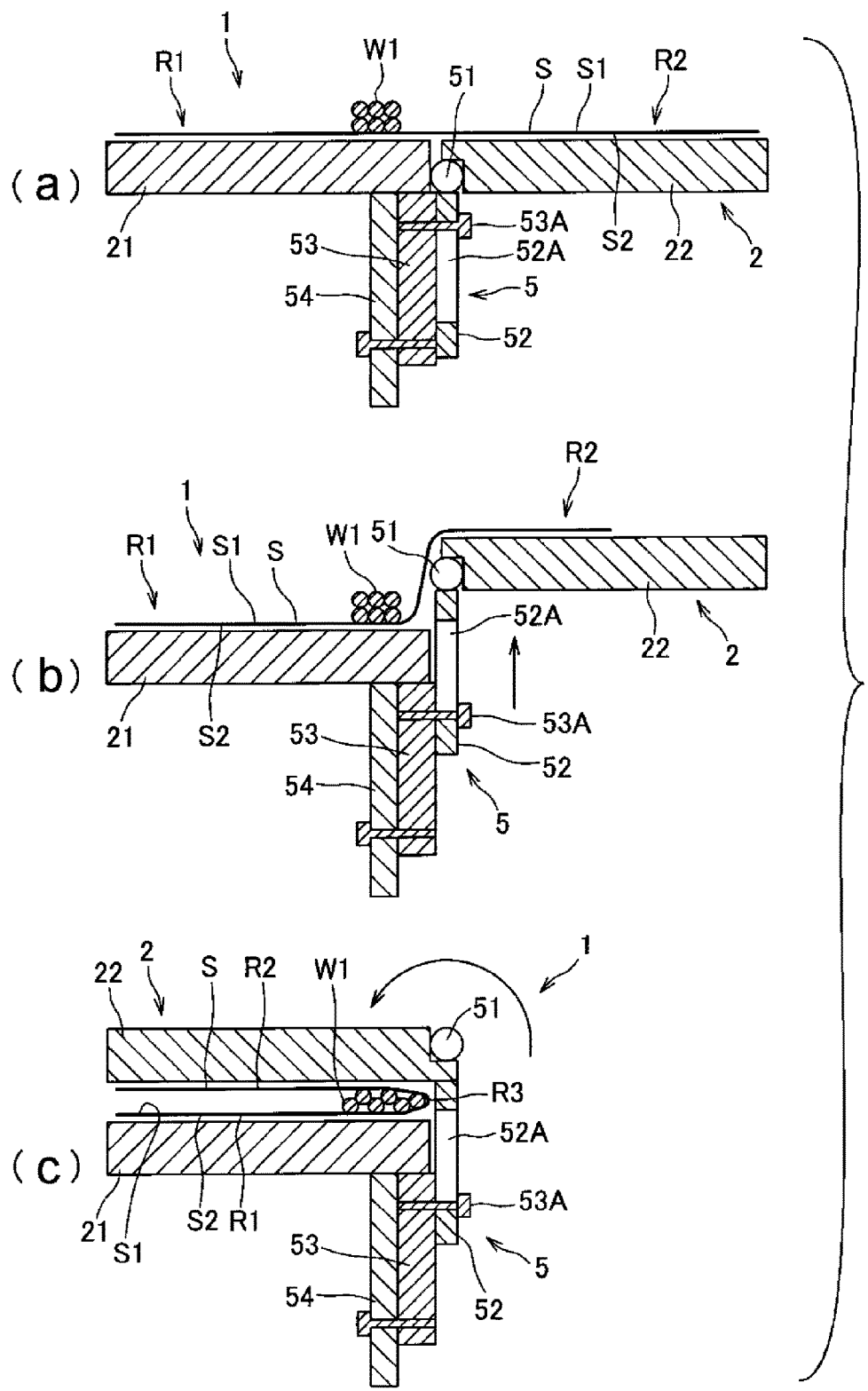
Figure 9:
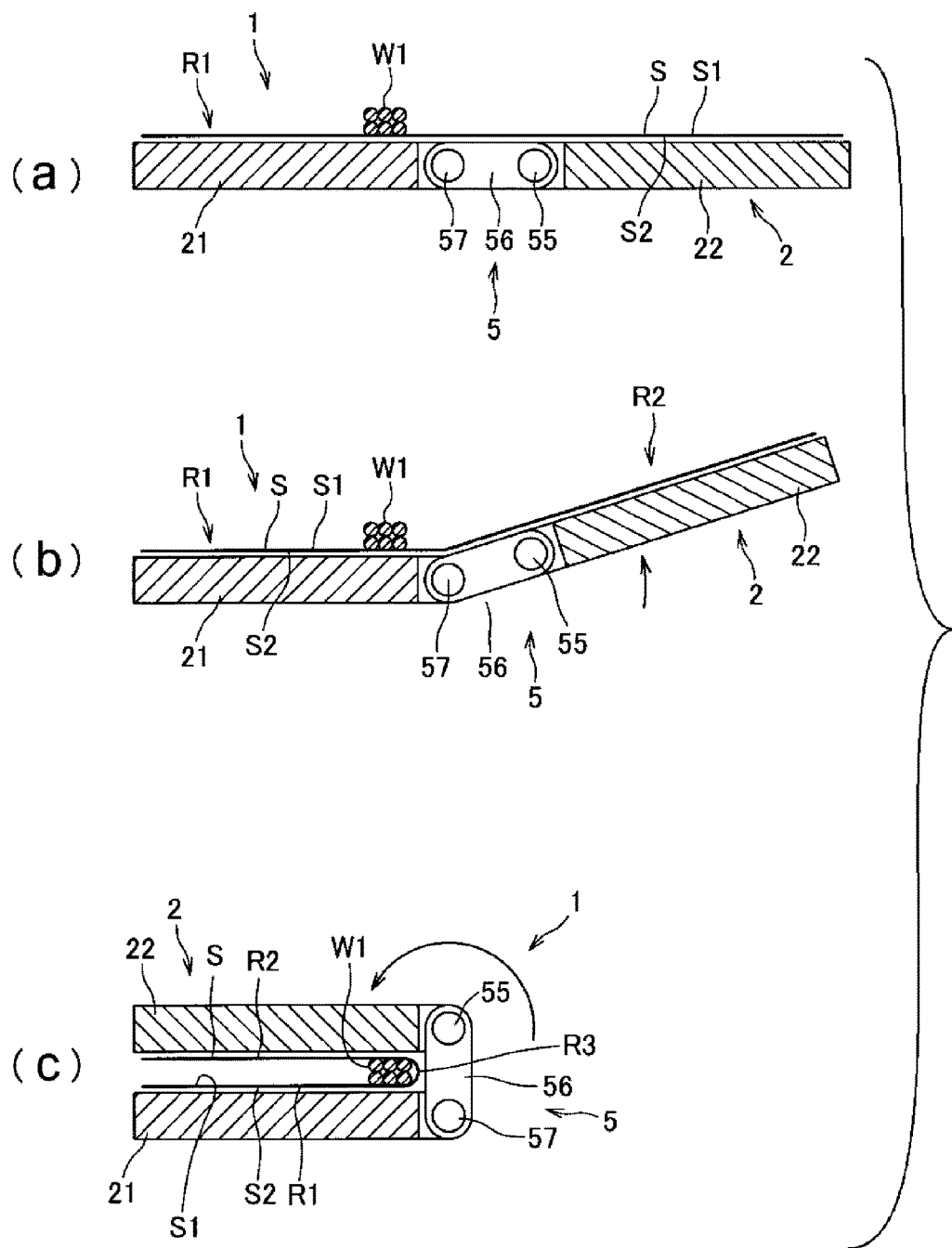

Further, in the sheathing member mounting apparatus 1 of the present first embodiment, the folding mechanism 5 may be formed of a hinge or the like where the first support portion 21 and the second support portion 22 are pivotably coupled together, or may have a structure shown in FIG. 8 and FIG. 9.

Specifically, the folding mechanism 5 shown in (a) of FIG. 8 is structured so as to be provided with a hinge portion 51 where the second support portion 22 is pivotably supported, a coupling plate 52 where this hinge portion 51 is coupled, a slide member 53 where this coupling plate 52 is slidably supported, and a fixed plate 54 where this slide member 53 is fixed. Further, a vertically extending elongate hole 52A is formed in the coupling plate 52, and a pin 53A is fixed to the slide member 53. And this pin 53A is inserted through the elongate hole 52A, whereby the coupling plate 52 is supported so as to be movable vertically.

Therefore, as shown in (b) of FIG. 8, by the coupling plate 52 being slid upward on the slide member 53, the second support portion 22 is parallelly moved upward. Thereafter, as shown in (c) of FIG. 8, the second support portion 22 is pivoted toward the first support portion 21 about the hinge portion 51, whereby the movement locus of the second support portion 22 becomes an ellipse elongated upward. According to such a folding mechanism 5, the first support portion 21 and the second support portion 22 can face each other under a condition where a predetermined gap is formed between the first support portion 21 and the second support portion 22. Therefore, even when the radial size of the electric wire portion W1 is large, that is, when the number of electric wires is large or the diameter of the electric wires is large, the sheet member S can be appropriately folded in two while the interference with the electric wire portion W1 is suppressed.

Moreover, the folding mechanism 5 shown in (a) of FIG. 9 is structured so as to be provided with a first hinge portion 55 where the second support portion 22 is pivotably supported, a link member 56 one end portion of which is pivotably coupled with this first hinge portion 55, and a second hinge portion 57 where the other end portion of this link member 56 is pivotably coupled with the first support portion 21.

Therefore, as shown in (b) and (c) of FIG. 9, the link member 56 is pivoted through the second hinge portion 57 with respect to the first support portion 21 and the second support portion 22 is pivoted through the first hinge portion 55 with respect to this link member 56, whereby the movement locus of the second support portion 22 becomes a non-arc elongated upward. According to such a folding mechanism 5, the first support portion 21 and the second support portion 22 can face each other under a condition where a predetermined gap corresponding to the length of the link member 56 is formed between the first support portion 21 and the second support portion 22. Therefore, even when the radial size of the electric wire portion W1 is large, that is, when the number of electric wires is large or the diameter of the electric wires is large, the sheet member S can be appropriately folded in two while the interference with the electric wire portion W1 is suppressed.

Figure 10A:
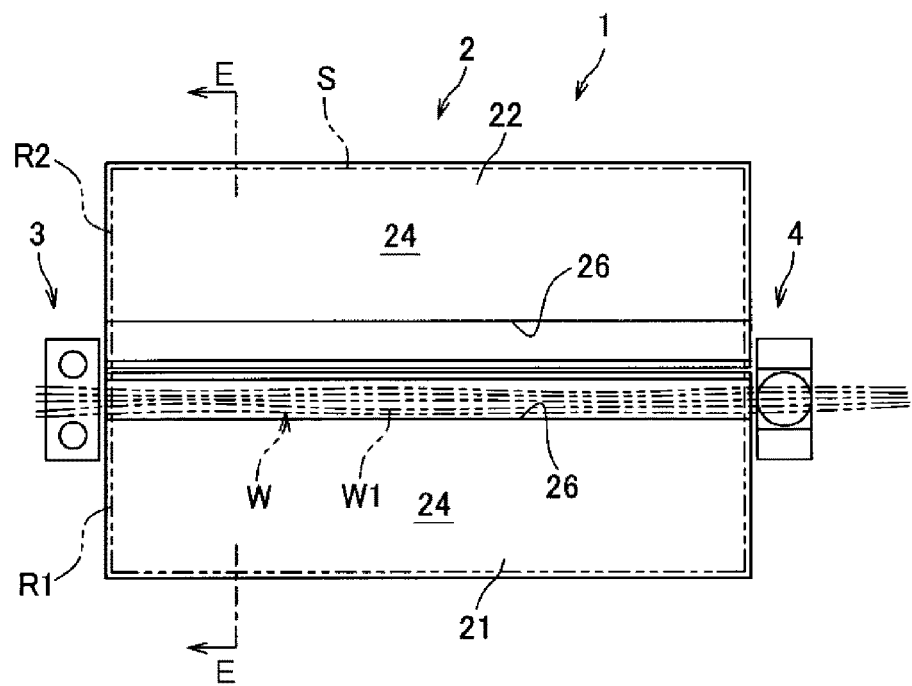
FIG. 10A is a plan view showing a modification of a support mechanism shown in FIG. 1.
Figure 10B:
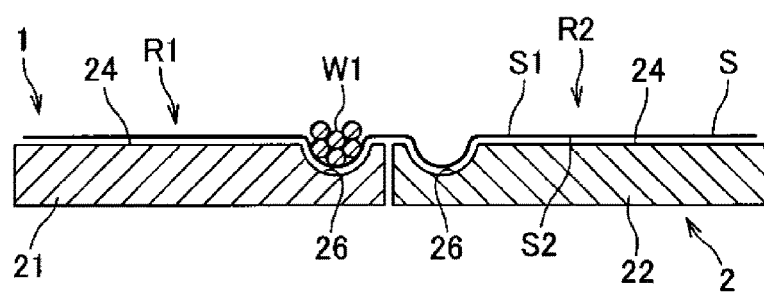
FIG. 10B is a cross-sectional view taken on arrow E-E of FIG. 10A.

Moreover, in the sheathing member mounting apparatus 1 of the present first embodiment, the first support portion 21 and the second support portion 22 may be structured so that, as shown in FIG. 10A and FIG. 10B, groove portions 26 recessed from the support surface 24 abutting on the protective layer S2 of the sheet member S are formed and the electric wire portion W1 is received in the groove portions 26. Specifically, the groove portions 26 are provided along the end edges of the first support portion 21 and the second support portion 22 where they are close to each other, and the groove 26 of the first support portion 21 is formed along the electric wire portion W1 held between the electric wire holding mechanism 3 and the electric wire holding mechanism 4.

Figure 10C:
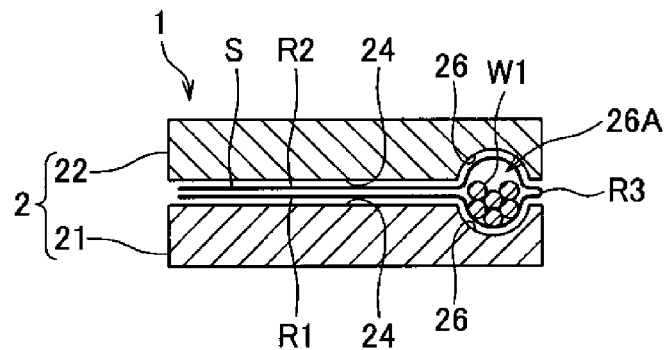
FIG. 10C is a cross-sectional view showing a condition where a second support portion shown in FIG. 10B is pivoted to face a first support portion.

Then, as shown in FIG. 10C, under a condition where the second support portion 22 is pivoted to face the first support portion 21, the groove portions 26 of the first support portion 21 and the second support portion 22 face each other to define a space 26A. That is, this space 26A is formed so that the sheet member S and the electric wire portion W1 can be received. Therefore, the part, other than the electric wire portion W1, of the folded sheet member S is sandwiched between the support surfaces 24 of the first support portion 21 and the second support portion 22, so that the bonding layer S1 of the sheet member S adheres tightly and is bonded together and that no sandwiching force acts on the electric wire portion W1 received in the space 26A.

Figure 11A:
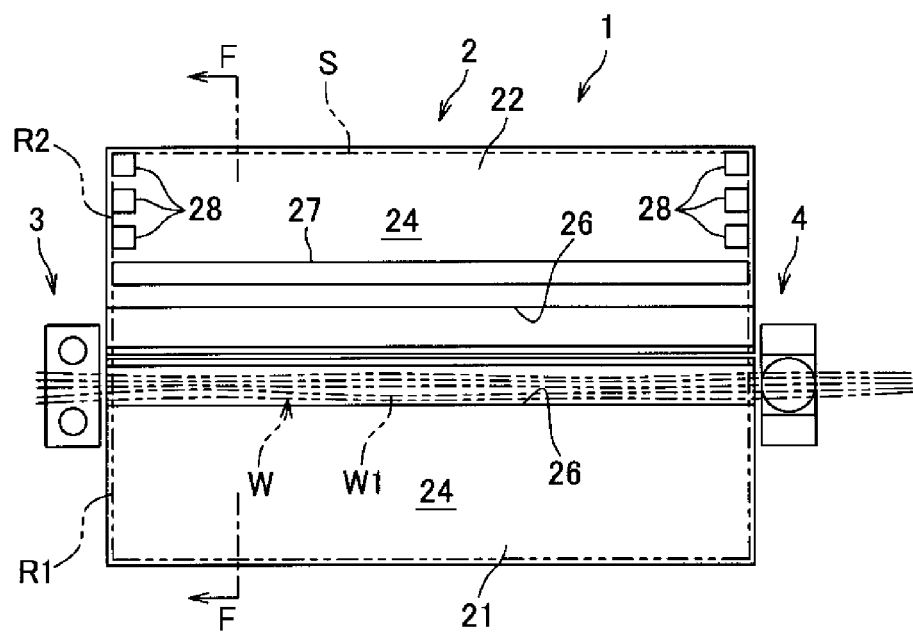
FIG. 11A is a plan view showing another modification of the support mechanism shown in FIG. 1.

Further, the support mechanism 2 shown in FIG. 11A is structured so as to be provided with, in addition to the groove portions 26, a pressing member 27 and pressing members 28 provided on the support surface 24 of the second support portion 22. The pressing member 27 and the pressing members 28 are made of a material having an appropriate flexibility so as to be elastically deformable. The pressing member 27 is provided along the groove 26 of the second support portion 22, and the pressing members 28 are provided along both end edges of the second support portion 22 on the sides of the electric wire holding mechanisms 3 and 4.

Figure 11B:
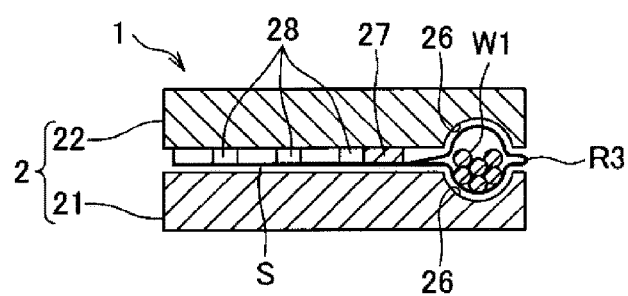
FIG. 11B is a cross-sectional view corresponding to arrow F-F of FIG. 11A under the condition where the second support portion is pivoted to face the first support portion.

And as shown in FIG. 11B, the pressing member 27 and the pressing members 28 are structured so that the sheet member S and the electric wire portion W1 can be received under a condition where the second support portion 22 is pivoted so as to face the first support portion 21. Consequently, they abut on the protective layer S2 in the second region R2 of the folded sheet member S, and this second region R2 is pressed toward the first region R1. Thereby, the bonding layer S1 of the sheet member S adheres tightly and is bonded together. In this case, the pressing member 27 provided along the neighborhood of the groove 26 (that is, the electric wire portion W1) presses the sheet member S to bond the bonding layer S1 together. Consequently, the sheet member S in the neighborhood of the electric wire portion W1 is firmly bonded, whereby the covered electric wire portion W1 can be prevented from being exposed. Further, for the pressing members 28 along the end edges on the sides of the electric wire holding mechanism 3 and the electric wire holding mechanism 4, its bonding can be prevented from coming off from the end edge portions of the sheet member S by firmly bonding the sheet member S.

Figure 12:
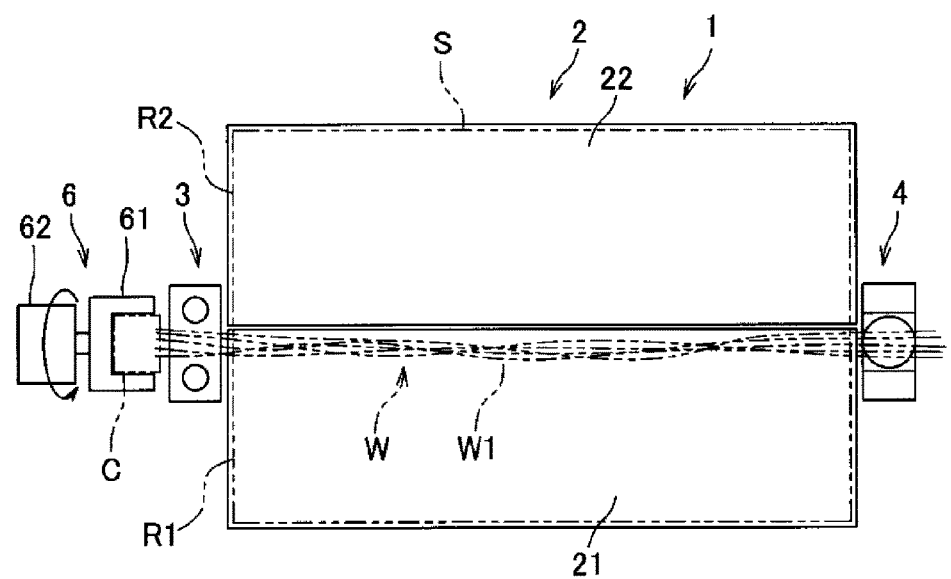
FIG. 12 is a plan view showing an electric wire twisting mechanism according to the sheathing member mounting apparatus shown in FIG. 1.
Figure 13A:
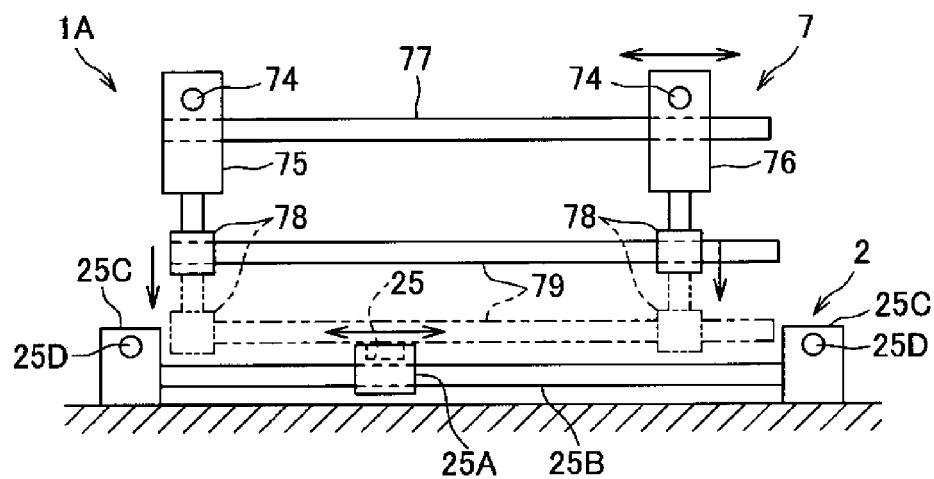
FIG. 13A is a front view showing an sheathing member mounting apparatus according to a second embodiment of the present invention.
Figure 13B:
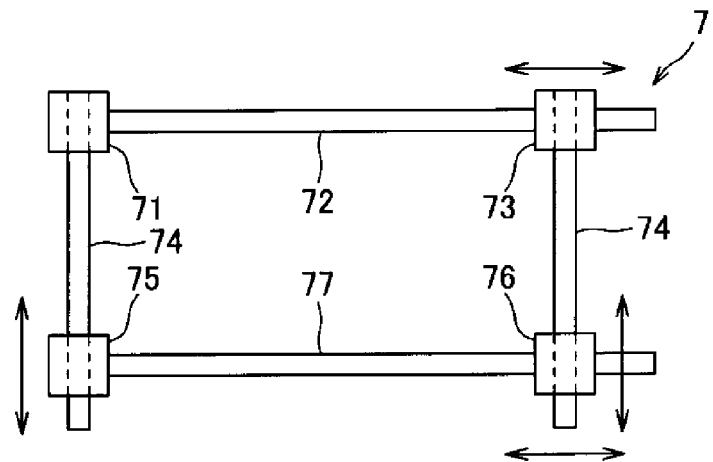
FIG. 13B is a plan view showing a pressing mechanism shown in FIG. 13A.
Figure 13C:
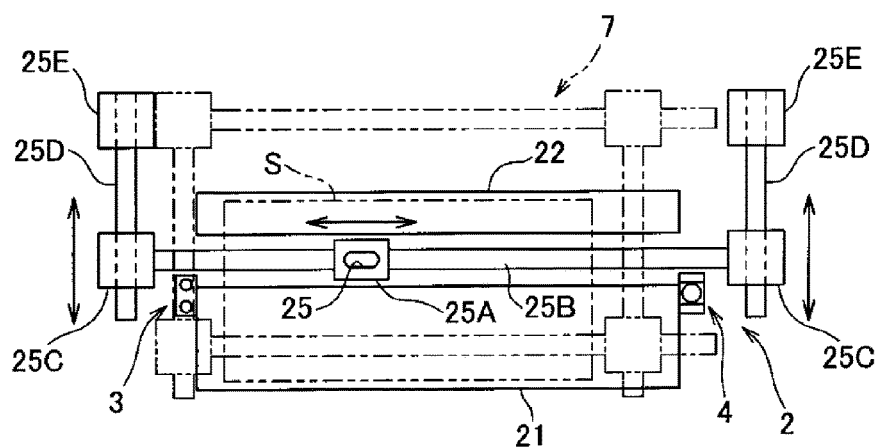
FIG. 13C is a schematic plan view of FIG. 13A.

Moreover, the sheathing member mounting apparatus 1 of the present first embodiment may be structured so as to be provided with an electric wire twisting mechanism 6 by which the electric wire portion W1 is rotated and twisted as shown in FIG. 12. Here, the wire harness W is provided with the electric wire portion W1 formed of a plurality of electric wires connected to the connector C. The electric wire twisting mechanism 6 is provided with a chuck portion 61 that grasps the connector C and a motor portion 62 that rotates this chuck portion 61. The electric wire twisting mechanism 6 is structured so that a plurality of electric wires of the electric wire portion W1 are twisted by the chuck portion 61 being rotated by the driving by the motor portion 62. Thus, under a condition where the electric wire portion W1 is held between the electric wire holding mechanism 3 and the electric wire holding mechanism 4, without a plurality of electric wires in the intermediate part thereof spreading out, the electric wire portion W1 is collectively disposed in the neighborhood of the folding line R3 which is a predetermined range of the sheet member S. Consequently, the sheet member S is easy to fold, and the required area of the sheet member S is reduced to enable material saving.

[Second Embodiment]

Next, a sheathing member mounting apparatus according to a second embodiment of the present invention will be described with reference to FIG. 13A to 14B.

The sheathing member mounting apparatus 1A of the present second invention is structured so as to be provided with the support mechanism 2, the electric wire holding mechanisms 3 and 4 and the folding mechanism 5 substantially similar to those of the sheathing member mounting apparatus 1 of the above-described first embodiment and a pressing mechanism 7 that presses the folded sheet member S. Moreover, the support mechanism 2 of the sheathing member mounting apparatus 1A is provided with an receiving member 25A where the concave portion 25 for receiving the protruding member S3 of the sheet member S (see FIG. 6A to FIG. 7B) is formed, as a member separate from the second support portion 22 and this receiving member 25A is provided so as to be movable, which is a difference from the sheathing member mounting apparatus 1 of the above-described first embodiment.

The receiving member 25A is mounted to a rod 25B extending in the arranging direction of the electric wire portion W1 (the horizontal direction of FIG. 13A), and is supported so as to be movable in the horizontal direction. The rod 25B has its both end portions supported by sliders 25C, respectively, these sliders 25C are slidably supported by a pair of rods 25D extending orthogonally to the rods 25B, respectively, and these rods 25D have their base end portions fixed to fixed portions 25E. Thus, the receiving member 25A (that is, the concave portion 25) is structured so as to be movable in the arranging direction of the electric wire portion W1 along the rod 25B and movable in a direction orthogonal to the arranging direction of the electric wire portion W1 by the slide of the sliders 25C along the rods 25D by a non-illustrated driving mechanism.

The pressing mechanism 7 is supported by a non-illustrated support frame above the support mechanism 2. This pressing mechanism 7 is structured so as to have a fixed portion 71 immovably fixed to the support frame, a rod 72 horizontally extending from this fixed portion 71, a slider 73 slidably supported by the rod 72, a pair of rods 74 extending from the fixed portion 71 and the slider 73 orthogonally to the rod 72, a pair of cylinders 75 and 76 slidably supported by the rods 74, respectively, a rod 77 extending parallel to the rod 72 between these pair of cylinders 75 and 76, end portions 78 fixed to the ends of output shafts extending downward from the cylinders 75 and 76, and a pressing member 79 supported between these end portions 78. This pressing member 79 is provided so as to be movable upward and downward by the protruding and retracting driving of the output shafts by the cylinders 75 and 76. Moreover, the pressing member 79 is structured so that the cylinders 75 and 76 are movable in the direction orthogonal to the arranging direction of the electric wire portion W1 along the rods 74 and the slider 73 and the cylinder 76 are movable in the arranging direction of the electric wire portion W1 along the rods 72 and 76 by a non-illustrated driving mechanism.

The sheathing member mounting apparatus 1A of the present second embodiment as described above operates as follows:

First, according to the sizes of the electric wire portion W1 and the sheet member S and the position of the protruding member S3 on the sheet member S, the receiving member 25A (that is, the concave portion 25) is moved in the arranging direction and the direction orthogonal to the arranging direction of the electric wire portion W1; thereafter, the sheet member S is placed and supported on the first support portion 21 and the second support portion 22 of the support mechanism 2, the electric wire portion W1 is disposed along the bonding layer S1 of the sheet member S and this electric wire portion W1 is held by the electric wire holding mechanisms 3 and 4. Further, according to the disposed sheet member S and electric wire portion W1, the cylinders 75 and 76 of the pressing mechanism 7 and the pressing member 79 are moved in the direction orthogonal to the electric wire portion W1, and the cylinder 76 is moved in the direction orthogonal to the electric wire portion W1.

Figure 14A:
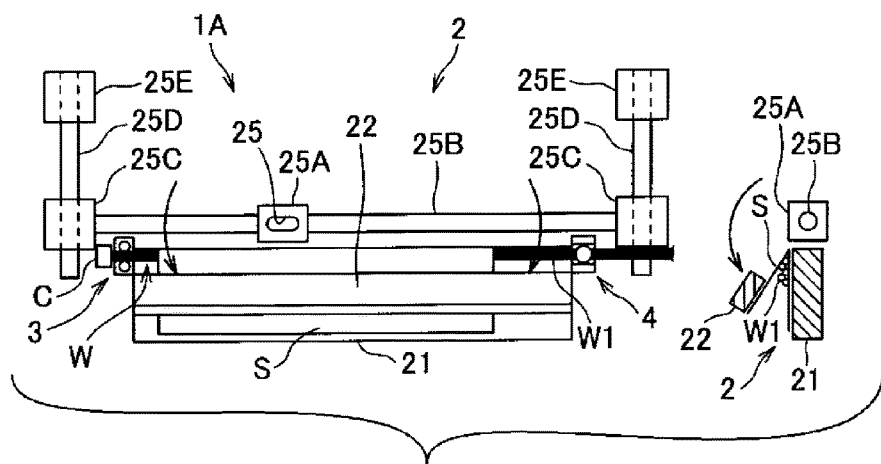
FIG. 14A is a plan view and a transverse cross-sectional view showing an operation of the sheathing member mounting apparatus shown in FIG. 13C.
Figure 14B:
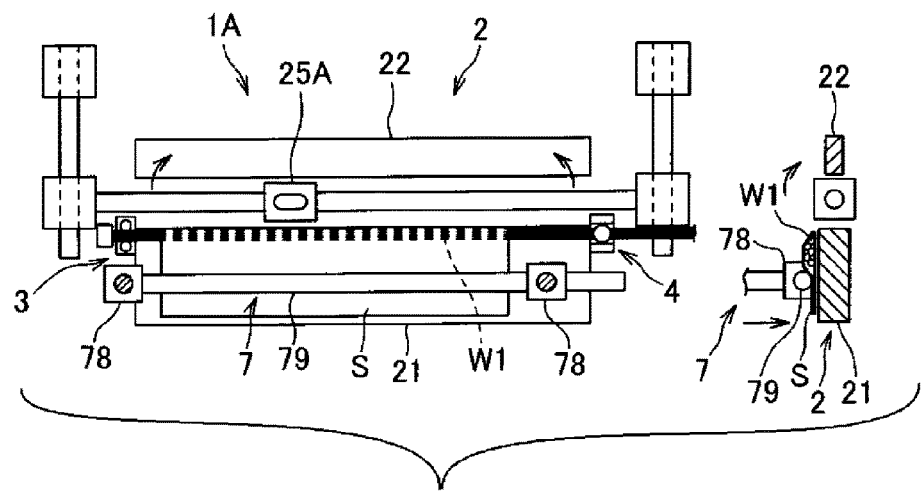
FIG. 14B is a plan view and a transverse cross-sectional view showing the operation of the sheathing member mounting apparatus shown in FIG. 14A.

When these parts are moved as described above, as shown in FIG. 14A, after the second support portion 22 of the support mechanism 2 is pivoted so that the sheet member S is folded toward the first support portion 21, the second support portion 22 is retreated to the initial position. Subsequently thereto, the cylinders 75 and 76 of the pressing mechanism 7 are driven, and as shown in FIG. 14B, the pressing member 79 is moved downward to abut on the sheet member S. Thereby, the bonding layer S1 of the sheet member S adheres tightly and is bonded together. While when the bonding layer S1 of the sheet member S is formed of the self-welding type or an adhesive type, it is necessary only that the pressing member 79 press the sheet member S, when the bonding layer S1 of the sheet member S is formed of the hot-melt type, a heating mechanism is provided to the pressing member 79.

[Third Embodiment]

Figure 15:
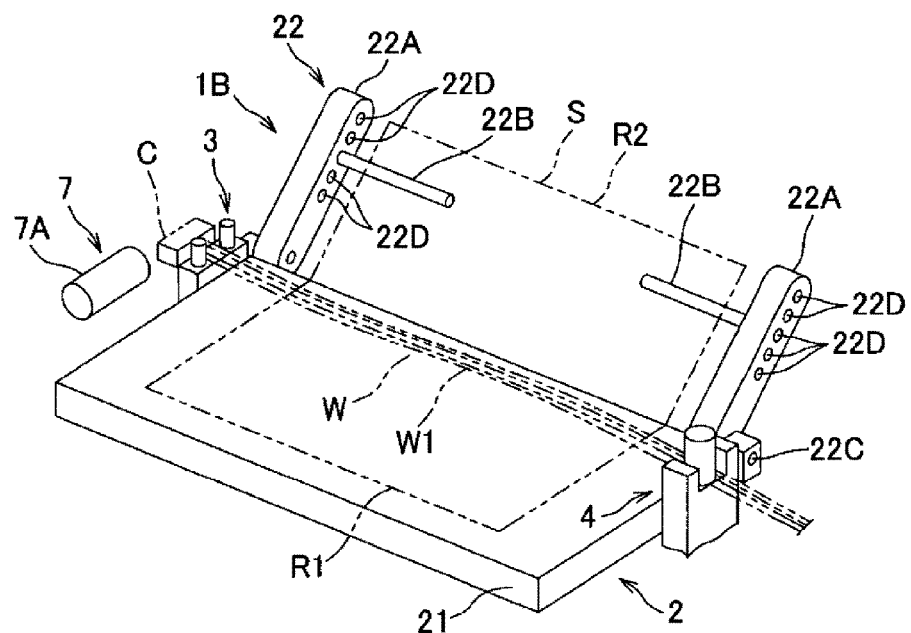
FIG. 15 is a perspective view showing an sheathing member mounting apparatus according to a third embodiment of the present invention.

Next, a sheathing member mounting apparatus according to a third embodiment of the present invention will be described with reference to FIGS. 15 to 16B.

The sheathing member mounting apparatus 1B of the present third embodiment is different from the above-described first embodiment in the structure of the second support portion 22 of the support mechanism 2, and is different from the above-described second embodiment in the structure of the pressing mechanism 7. That is, the second support portion 22 is structured so as to be provided with a pair of pivoting arms 22A and support rods 22B mounted to the pivoting arms 22A to support the second region R2 of the sheet member S. The pivoting arms 22A are pivotably supported by hinge portions 22C provided adjacent to the first support portion 21 and are pivoted by a non-illustrated pivoting mechanism such as a handle, and a folding mechanism is constituted by these hinge portions 22C and pivoting mechanism. Moreover, on the pivoting arms 22A, a plurality of insertion holes 22D are formed at predetermined intervals in the direction of the length thereof, and the support rods 22B are inserted into these insertion holes 22D and selectively mounted. Therefore, the second support portion 22 is structured so that the position of support by the support rods 22B can be changed by appropriately selecting the insertion holes 22D into which the support rods 22B are inserted according to the width dimension of the sheet member S. Moreover, the pressing mechanism 7 is structured so as to have a pressing roller 7A and a non-illustrated driving mechanism that rolls this pressing roller 7A along the first support portion 21.

The sheathing member mounting apparatus 1B of the present third embodiment as described above operates as follows:

First, according to the sizes of the electric wire portion W1 and the sheet member S, appropriate insertion holes 22D are selected from among the plurality of insertion holes 22D of the pivoting arms 22A and the support rods 22B are inserted thereinto. Thereafter, the sheet member S is placed and supported on the pair of support rods 22B of the first support portion 21 and the second support portion 22 of the support mechanism 2, the electric wire portion W1 is disposed along the bonding layer S1 of the sheet member S and this electric wire portion W1 is held by the electric wire holding mechanisms 3 and 4.

Figure 16A:
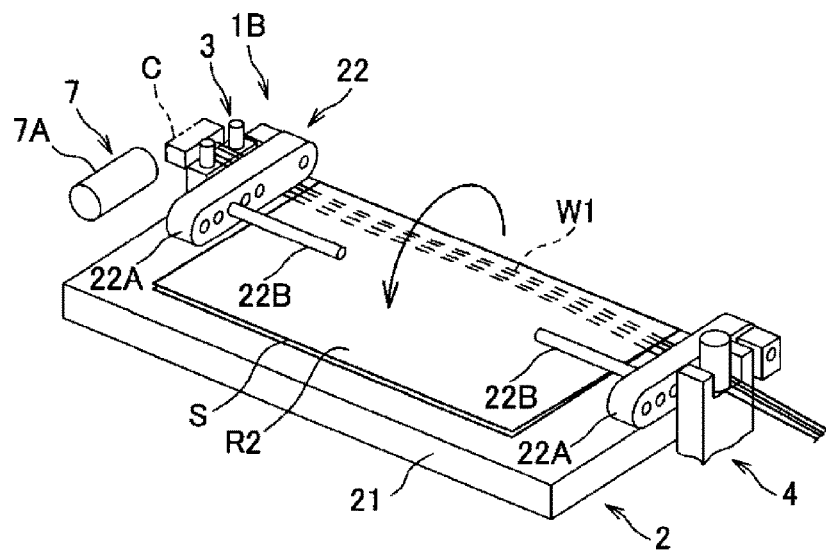
FIG. 16A is a perspective view showing an operation of the sheathing member mounting apparatus shown in FIG. 15.
Figure 16B:
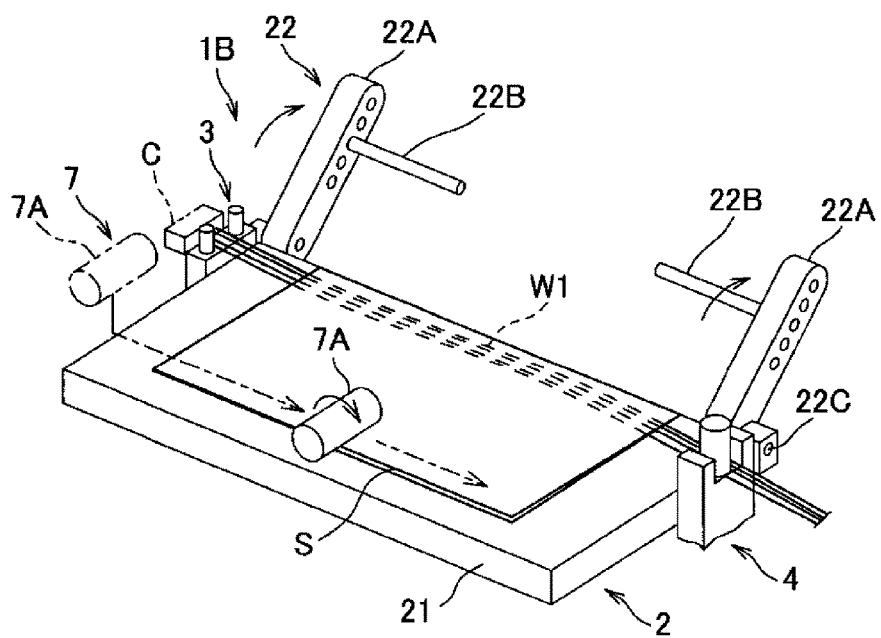
FIG. 16B is a perspective view showing the operation of the sheathing member mounting apparatus shown in FIG. 16A.

Then, as shown in FIG. 16A, after the pair of pivoting arms 22A are pivoted by the pivoting mechanism so that the sheet member S is folded toward the first support portion 21, the pivoting arms 22A are retreated to the initial position. Subsequently thereto, the pressing roller 7A of the pressing mechanism 7 is driven, and as shown in FIG. 16B, the pressing roller 7A abutting on the sheet member S rolls. Thereby, the bonding layer S1 of the sheet member S adheres tightly and is bonded together. While when the bonding layer S1 of the sheet member S is formed of the self-welding type or the adhesive type, it is necessary only that the pressing roller 7A press the sheet member S, when the bonding layer 51 of the sheet member S is formed of the hot-melt type, a heating mechanism is provided to the pressing roller 7A and the first support portion 21.

[Fourth Embodiment]

Figure 17:
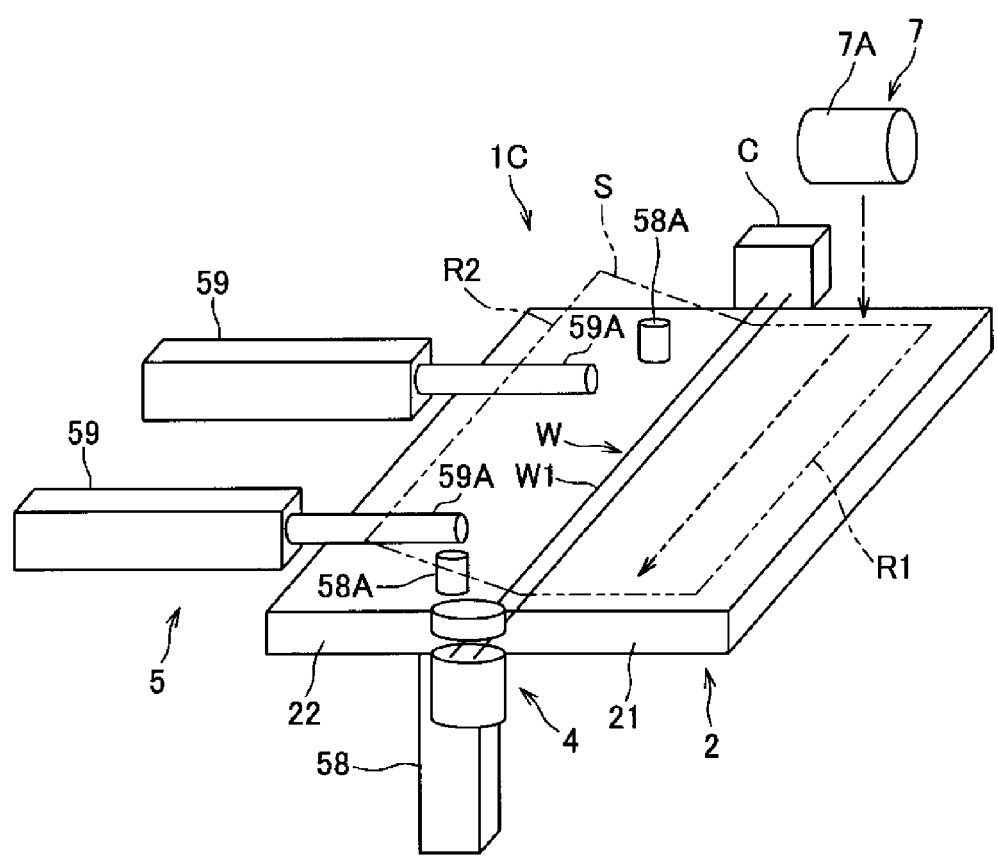
FIG. 17 is a perspective view showing an sheathing member mounting apparatus according to a fourth embodiment of the present invention.
(a) to (d) of FIG. 18 are cross-sectional views for explaining an operation of the sheathing member mounting apparatus shown in FIG. 17.

Next, a sheathing member mounting apparatus according to a fourth embodiment of the present invention will be described with reference to FIGS. 17 to 18.

The sheathing member mounting apparatus 1C of the present fourth embodiment is different from the above-described embodiments in the structure of the second support portion 22 of the support mechanism 2, and is different from the above-described embodiments in the structure of the folding mechanism 5. That is, in the support mechanism 2 of the present fourth embodiment, the second support portion 22 is not pivotably provided as in the above-described embodiments, but is structured in the form of one plate where the first support portion 21 and the second support portion 22 are integrally provided. Moreover, the folding mechanism 5 is structured so as to be provided with a pair of first cylinders 58 as a first movement mechanism by which the second region R2 of the sheet member S is raised from the second support portion 22 and a pair of second cylinders 59 as a second movement mechanism by which the second region R2 of the sheet member S raised by these first cylinders 58 is moved toward the first support portion 21.

The pair of cylinders 58 are each provided on the under side of the second support portion 22, and output shafts 58A thereof are provided so as to be protrudable and retractable from the upper side through the second support portion 22. The pair of second cylinders 59 are each provided above the upper surface adjacent to the second support portion 22, and output shafts 59A thereof are provided so as to be protrudable and retractable through above the second support portion 22 to the side of the first support portion 21.

Figure 18:
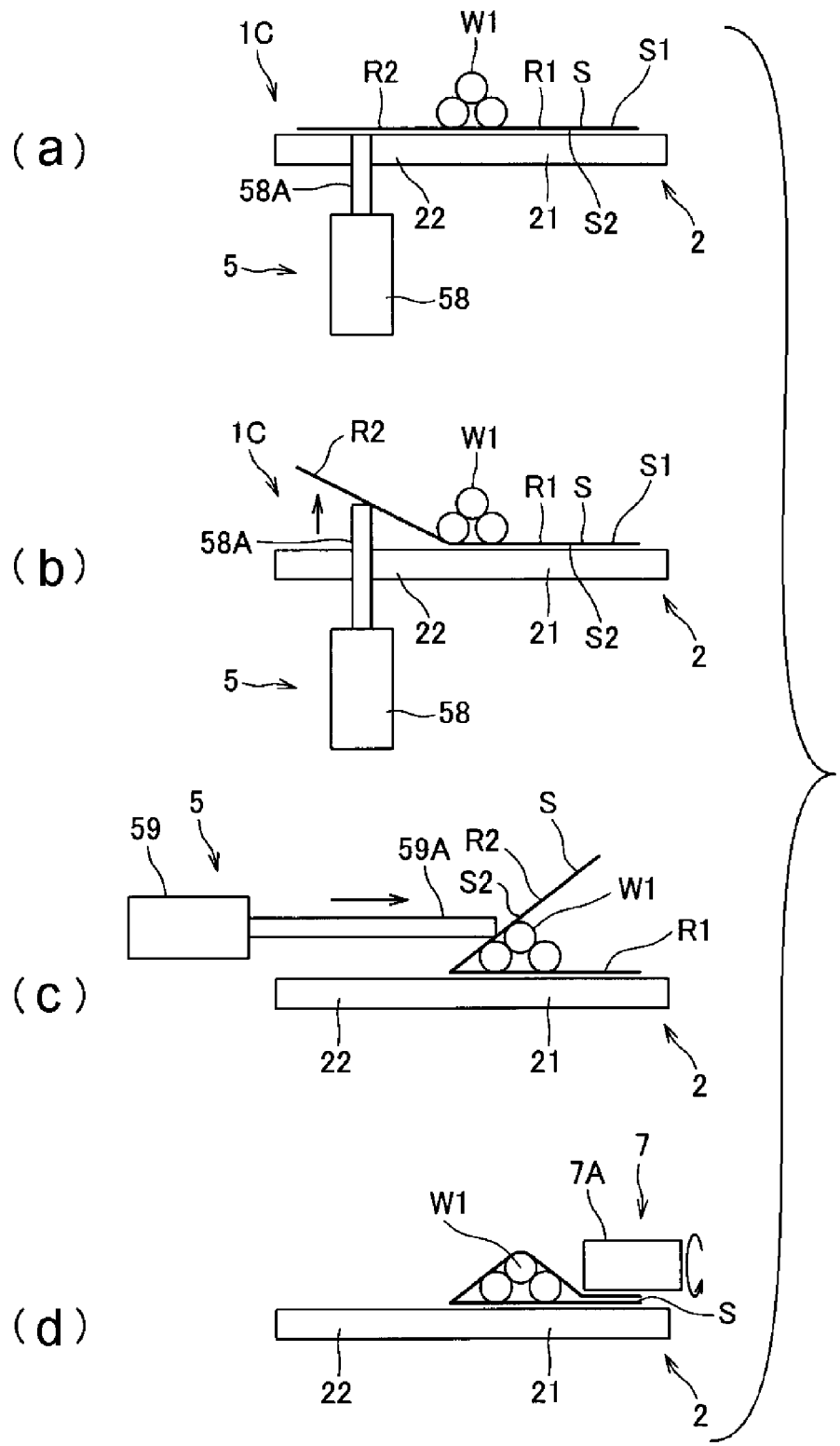

The sheathing member mounting apparatus 1C of the present fourth embodiment as described above operates as follows:

First, as shown in (a) of FIG. 18, the sheet member S is placed and supported on the first support portion 21 and the second support portion 22 of the support mechanism 2, the electric wire portion W1 is disposed along the bonding layer S1 of the sheet member S and this electric wire portion W1 is held by the electric wire holding mechanisms 3 and 4.

Then, as shown in FIG. 18(b), the output shafts 58A of the first cylinders 58 protrude from the second support portion 22 to abut on the protective layer S2 of the sheet member S, so that the second region R2 of the sheet member S is raised from the second support portion 22.

Further, as shown in FIG. 18(c), the output shafts 59A of the second cylinders 59 protrude along the upper surface of the second support portion 22 to abut on the protective layer S2 of the sheet member S, so that the second region R2 of the sheet member S moves toward the first support portion 21. Thereby, the sheet member S is folded.

Then, the output shafts 58A and 59A of the first cylinders 58 and the second cylinders 59 are retracted to the initial positions. Subsequently thereto, the pressing roller 7A of the pressing mechanism 7 is driven, and as shown in FIG. 18(d), the pressing roller 7A abutting on the sheet member S rolls. Thereby, the bonding layer S1 of the sheet member S adheres tightly and is bonded together.

According to the embodiments as described above, the sheet member S is folded by the folding mechanism 5 from the condition where the sheet member S is supported by the support mechanism 2, and the electric wire portion W1 of the wire harness W is sandwiched in the folded sheet member S to be covered, whereby the sheet member S can be mounted to the wire harness W easily and reliably. Further, since the electric wire portion W1 disposed along the bonding layer S1 of the sheet member S is held by the electric wire holding mechanisms 3 and 4, it is unnecessary for the worker to hold the wire harness W, so that the mounting of the sheet member S can be performed more efficiently. Consequently, in the process of producing the wire harness W, for example, for preharnesses in a state of being placed on a wiring board or the like, the sheet member S can be efficiently and reliably mounted to predetermined wiring portions W1, so that the production efficiency of the wire harness W can be improved.

While a case where the sheet member S is mounted to the electric wire portions W1 in a plurality of positions of the wire harness W is shown as an example in the above-described embodiments, the sheathing member mounting apparatus of the present invention may be used in a case where one sheet member S is mounted to one wire harness W. Moreover, while a case where the placement of the sheet member S and the wire portion W1 on the support mechanism 2 is performed by a worker's manual operation is described in the above-described embodiments, the present invention is not limited thereto; an automatic placement mechanism where the sheet member S and the electric wire portion W1 are automatically placed may be provided. Further, an automatic pivoting mechanism where the folding mechanism 5 automatically pivots the second support portion 22 may be provided. Moreover, the sheathing member mounting apparatus may be structured so as to be provided with a control mechanism for controlling the driving of the parts.

Now, the features of the above-described embodiments of the sheathing member mounting apparatus and the sheathing member mounting method according to the present invention will be briefly summarized and listed below.

[1] A sheathing member mounting apparatus 1 for mounting the sheathing member (sheet member) S for covering the electric wire portion W1 of the wire harness W, to the wire harness W, the sheathing member (sheet member) S being formed of the sheet member S that is formed in the shape of a sheet where the bonding layer S1 is provided on one surface and the protective layer S2 is provided on the other surface, sandwiching the electric wire portion W1 under a condition where the bonding layer S1 is on the inside, and covering the electric wire portion W1 by the bonding layer S1 being bonded together, the sheathing member mounting apparatus 1 being provided with: the support mechanism 2 that supports the sheet member S from the side of the protective layer S2; the electric wire holding mechanisms 3 and 4 that hold the electric wire portion W1 in a state of being disposed along the bonding layer S1 of the sheet member S supported by the support mechanism 2; and the folding mechanism 5 that folds in two the sheet member S supported by the support mechanism 2, wherein the support mechanism 2 is structured so as to have the first support portion 21 that supports the region (first region) R1 substantially half of the plane of the sheet member S and the second support portion 22 that supports the remaining region (second region) R2 of the sheet member S other than the region (first region) R1 substantially half of the plane, and the remaining region (second region) R2 of the sheet member S is pivoted toward the first support portion 21 by the folding mechanism 5, whereby the sheet member S is folded.

[2] The sheathing member mounting apparatus 1 according to the above [1], wherein the sheet member S is structured so as to have the protruding member S3 that protrudes from the protective layer S2 and to be mountable to the fixed body (vehicle body) by engagement of the protruding member S3, and one or more than one concave portion 25 for receiving the protruding member S3 is formed on at least one of the first support portion 21 and the second support portion 22, and the concave portion 25 is provided in a predetermined position in the direction of the plane of the sheet member S or provided so as to be movable in the direction of the plane of the sheet member S.

[3] The sheathing member mounting apparatuses 1 and 1A according to the above [1] or [2], wherein the bonding layer S1 of the sheet member S is formed of any one of the self-welding type, the bonding type and the hot-melt type, and when the bonding layer S1 is formed of the self-welding type, the pressing mechanism 7 that presses the sheet member S folded by the folding mechanism 5 is provided and when the bonding layer S is formed of the hot-melt type, the heating mechanism (heater) 23 that heats the sheet member S is provided to the support mechanism 2.

[4] The sheathing member mounting apparatuses 1 and 1C according to any of the above [1] to [3], wherein the folding mechanism 5 is structured so as to be provided with the hinge portion 51 where the second support portion 22 is pivotably supported and the slide member 53 where the hinge portion 51 is slidably supported, is structured so as to be provided with the hinge portion (first hinge portion) 55 where the second support portion 22 is pivotably supported and the link member 56 where the other end side extending from the hinge portion (first hinge portion) 55 is pivotably supported, or is structured so as to be provided with the first movement mechanism (first cylinder) 58 by which the remaining region (second region) R2 of the sheet member S is raised from the second support portion 22 and the second movement mechanism (second cylinder) 59 by which the remaining region (second region) R2 of the sheet member S raised by the first movement mechanism (first cylinder) 58 is moved toward the first support portion 21.

[5] The sheathing member mounting apparatus 1 according to any of the above [1] to [4], wherein the support mechanism 2 is structured so as to be provided with the support surface 24 abutting on the protective layer S2 of the sheet member S and the groove portion 26 recessed from the support surface 24 and extending along the electric wire portion W1 held by the electric wire holding mechanisms 3 and 4.

[6] The sheathing member mounting apparatus 1 according to any of the above [1] to [5], wherein the electric wire portion W1 is formed of a plurality of electric wires and the electric wire twisting mechanism 6 by which the plurality of electric wires are rotated and twisted is further provided.

[7] A sheathing member mounting method for mounting the sheathing member (sheet member) S for covering the electric wire portion W1 of the wire harness W, to the wire harness W, the sheathing member (sheet member) S being formed of the sheet member S that is formed in the shape of a sheet where the bonding layer S1 is provided on one surface and the protective layer S2 is provided on the other surface, sandwiching the electric wire portion W1 under a condition where the bonding layer S1 is on the inside, and covering the electric wire portion W1 by the bonding layer S1 being bonded together, wherein the sheet member S is supported from the side of the protective layer S2, and after the electric wire portion W1 is held in the state of being disposed along the bonding layer S1 of the supported sheet member S, toward the region (first region) R1 substantially half of the plane of the sheet member S, the remaining region (second region) R2 other than the region (first region) R1 substantially half of the plane is pivoted, whereby the sheet member S is folded and the electric wire portion W1 is covered by the sheet member S.

[8] The sheathing member mounting method according to the above [7], being a method in which the sheet member S is structured so as to have the protruding member S3 that protrudes from the protective layer S2 and to be mountable to the fixed body (vehicle body) by engagement of the protruding member S3, and the sheet member S is folded under a condition where the protruding member S3 is inserted into the concave portion 25, wherein the predetermined concave portion 25 is selected from among a plurality of concave portions 25 provided in the direction of the plane of the sheet member S and the protruding member S3 is inserted thereinto, or the concave portion 25 provided so as to be movable in the direction of the plane of the sheet member S is moved to a predetermined position and the protruding member S3 is inserted thereinto.

[9] The sheathing member mounting method according to the above [7] or [8], wherein the bonding layer S1 of the sheet member S is formed of any one of the self-welding type, the bonding type and the hot-melt type, and when the bonding layer S1 is formed of the self-welding type, the folded sheet member S is pressed so that the bonding layer S1 is bonded together and when the bonding layer S1 is formed of the hot-melt type, the sheet member S is heated so that the bonding layer S1 is bonded together.

[10] The sheathing member mounting method according to any of the above [7] to [9], wherein the electric wire portion W1 is formed of a plurality of electric wires, and the sheet member S is folded after the plurality of electric wires are rotated and twisted.

The sheathing member mounting apparatus and the sheathing member mounting method of the present invention are not limited to the above-described embodiments, but modifications, improvements and the like may be made as appropriate. In addition, the material, configuration, dimensions, number, position of disposition and the like of each structural element in the above-described embodiments are arbitrary as long as the present invention can be attained, and are not limited.

According to the sheathing member mounting apparatus and the sheathing member mounting method of the present invention, the efficiency of the sheathing member mounting work is improved without the apparatus becoming large or complicated.

What is claimed is:

1. A sheathing member mounting method for mounting a sheathing member for covering an electric wire portion of a wire harness, to the wire harness, the sheathing member being formed of a sheet member that is formed in a shape of a sheet where a bonding layer is provided on one surface and a protective layer is provided on the other surface, the sheet member includes a first edge and a second edge opposite to the first edge, the method comprising:
    sandwiching the electric wire portion under a condition where the bonding layer is on an inside; and
    covering the electric wire portion by the bonding layer being bonded together, wherein the sandwiching the electric wire includes
    supporting a region substantially half of a plane of the sheet member, which region includes the first edge, on a side of the protective layer and separately supporting a remaining region other than the region substantially half of the plane, which remaining region includes the second edge, on the side of the protective layer,
    holding the electric wire portion in a state of being disposed along the bonding layer of the supported sheet member, and
    pivoting the second edge toward the first edge such that the sheet member is folded, the electric wire portion is covered by the sheet member, and the second edge abuts the first edge.

2. The sheathing member mounting method according to claim 1,
    being a method in which the sheet member includes a protruding member that protrudes from the protective layer, and is mountable to a fixed body by engagement of the protruding member, and the sheet member is folded under a condition where the protruding member is inserted into a concave portion, wherein
    a predetermined concave portion is selected from among a plurality of concave portions provided in a direction of the plane of the sheet member and the protruding member is inserted thereinto, or the concave portion provided so as to be movable in the direction of the plane of the sheet member is moved to a predetermined position and the protruding member is inserted thereinto.

3. The sheathing member mounting method according to claim 1, wherein
    the bonding layer of the sheet member is formed of any one of a self-welding type, a bonding type and a hot-melt type, and
    when the bonding layer is formed of the self-welding type, the folded sheet member is pressed so that the bonding layer is bonded together, and when the bonding layer is formed of the hot-melt type, the sheet member is heated so that the bonding layer is bonded together.

4. The sheathing member mounting method according to claim 1, wherein the electric wire portion is formed of a plurality of electric wires, and the sheet member is folded after the plurality of electric wires are rotated and twisted.

5. A sheathing member mounting apparatus for mounting a sheathing member for covering an electric wire of a harness, the sheathing member: being formed of a sheet member that is formed in a shape of a sheet where a bonding layer is provided on one surface and a protective layer is provided on the other surface; sandwiching the electric wire portion under a condition where the bonding layer is on an inside; and covering the electric wire portion by the bonding layer being bonded together,
    the sheathing member mounting apparatus comprising:
    a support mechanism that supports the sheet member from a side of the protective layer;
    an electric wire holding mechanism that holds the electric wire portion in a state of being disposed along the bonding layer of the sheet member supported by the support mechanism; and
    a folding mechanism that folds in two the sheet member supported by the support mechanism, wherein
    the support mechanism includes: a first support portion that is configured to support a region substantially half of a plane of the sheet member; a second support portion that is configured to support a remaining region of the sheet member other than the region substantially half of the plane; and one or more than one concave portion movable relative to each of the first support portion and the second support portion, and movable in a direction of the plane of the sheet member if the sheet member is supported on the support mechanism,
    and the remaining region of the sheet member is pivoted toward the first support portion by the folding mechanism, whereby the sheet member is folded.

6. The sheathing member mounting apparatus according to claim 5, wherein
    the sheet member includes a protruding member that protrudes from the protective layer, and is mountable to a fixed body by engagement of the protruding member, and
    the one or more than one concave portion receives the protruding member and is formed on at least one of the first support portion and the second support portion.

7. The sheathing member mounting apparatus according to claim 5, wherein
    the bonding layer of the sheet member is formed of any one of a self-welding type, a bonding type and a hot-melt type, and
    when the bonding layer is formed of the self-welding type, a pressing mechanism that presses the sheet member folded by the folding mechanism is provided, and when the bonding layer is formed of the hot-melt type, a heating mechanism that heats the sheet member is provided to the support mechanism.

8. The sheathing member mounting apparatus according to claim 5, wherein
    the folding mechanism
    includes: a hinge portion where the second support portion is pivotably supported; and a slide member where the hinge portion is slidably supported, includes: a hinge portion where the second support portion is pivotably supported; and a link member where an other end side extending from the hinge portion is pivotably supported, or includes: a first movement mechanism by which the remaining region of the sheet member is raised from the second support portion; and a second movement mechanism by which the remaining region of the sheet member raised by the first movement mechanism is moved toward the first support portion.

9. The sheathing member mounting apparatus according to claim 5, wherein the support surface of the first support portion is configured to abut the protective layer of the sheet member; and the first support portion includes a groove portion recessed from the support surface and is configured to extend along the electric wire portion if the electric wire portion is held by the electric wire holding mechanism.

10. The sheathing member mounting apparatus according to claim 5, wherein the electric wire portion is formed of a plurality of electric wires, and an electric wire twisting mechanism by which the plurality of electric wires are rotated and twisted is further provided.

11. The sheathing member mounting apparatus according to claim 5, wherein the support mechanism further includes a first rod, a second rod spaced apart from the first rod and extending substantially parallel to the first rod, and a third rod slidably connected to each of the first rod and the second rod, and the concave portion is slidably connected to the third rod.

* * * * *